Nov. 22, 1960 J. H. HAMMOND, JR., ET AL 2,961,481

SECRECY TELEVISION

Filed Dec. 30, 1954 20 Sheets-Sheet 1

INVENTORS
JOHN HAYS HAMMOND, JR
& ELLISON S. PURINGTON
BY
[signature]
ATTORNEY

INVENTORS
JOHN HAYS HAMMOND, JR.
& ELLISON S. PURINGTON
BY
ATTORNEY

INVENTORS
JOHN HAYS HAMMOND, JR. AND
ELLISON S. PURINGTON
BY
ATTORNEY

SECRECY TELEVISION

INVENTORS
JOHN HAYS HAMMOND, JR. AND
ELLISON S. PURINGTON
BY [signature]
ATTORNEY INVENTORS
JOHN HAYS HAMMOND, JR. AND
ELLISON S. PURINGTON
BY
[signature]
ATTORNEY

INVENTORS
JOHN HAYS HAMMOND, JR.
& ELLISON S. PURINGTON
BY
ATTORNEY

Nov. 22, 1960 J. H. HAMMOND, JR., ET AL 2,961,481

SECRECY TELEVISION

Filed Dec. 30, 1954 20 Sheets-Sheet 7

INVENTORS
JOHN HAYS HAMMOND, JR.
& ELLISON S. PURINGTON
BY
[signature]
ATTORNEY

Nov. 22, 1960 J. H. HAMMOND, JR., ET AL 2,961,481

SECRECY TELEVISION

Filed Dec. 30, 1954 20 Sheets-Sheet 8

INVENTORS
JOHN HAYS HAMMOND, JR.
& ELLISON S. PURINGTON
BY

ATTORNEY

INVENTORS
JOHN HAYS HAMMOND, JR.
& ELLISON S. PURINGTON
BY
ATTORNEY

INVENTORS
JOHN HAYS HAMMOND, JR.
& ELLISON S. PURINGTON
BY
ATTORNEY

INVENTORS
JOHN HAYS HAMMOND, JR.
& ELLISON S. PURINGTON
BY

ATTORNEY

INVENTORS
JOHN HAYS HAMMOND, JR.
& ELLISON S. PURINGTON
BY
[signature]
ATTORNEY

Nov. 22, 1960 J. H. HAMMOND, JR., ET AL 2,961,481

SECRECY TELEVISION

Filed Dec. 30, 1954 20 Sheets-Sheet 13

INVENTORS
JOHN HAYS HAMMOND, JR. AND
ELLISON S. PURINGTON
BY
ATTORNEY

Nov. 22, 1960 J. H. HAMMOND, JR., ET AL 2,961,481

SECRECY TELEVISION

Filed Dec. 30, 1954 20 Sheets-Sheet 14

INVENTORS
JOHN HAYS HAMMOND, JR.
& ELLISON S. PURINGTON
BY [signature]
ATTORNEY

INVENTORS
JOHN HAYS HAMMOND, JR.
& ELLISON S. PURINGTON
BY
ATTORNEY

INVENTORS
JOHN HAYS HAMMOND, JR. &
ELLISON S. PURINGTON
BY
ATTORNEY

SECRECY TELEVISION

Filed Dec. 30, 1954 20 Sheets-Sheet 17

INVENTORS
JOHN HAYS HAMMOND, JR.
ELLISON S. PURINGTON
BY
ATTORNEY

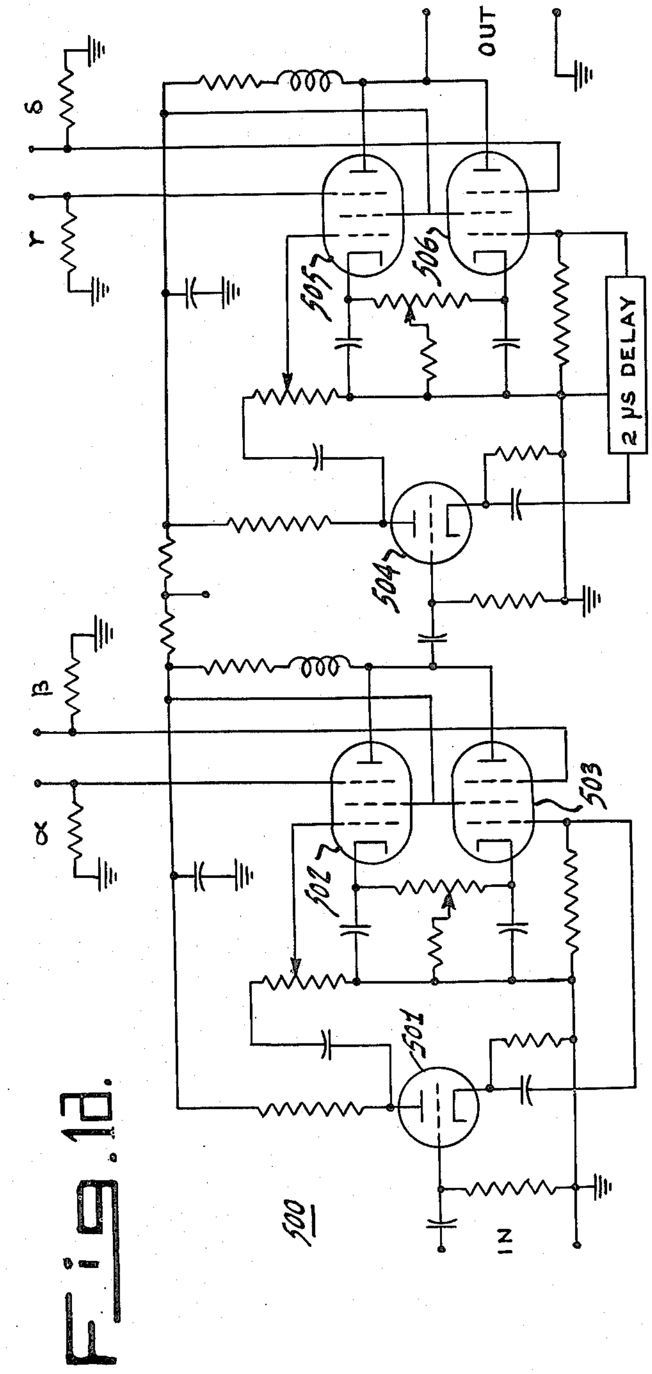

Fig. 18

| COMBINATION | TERMINALS 1ST. STAGE GND. | TERMINALS 1ST. STAGE NEG. | TERMINALS 2ND. STAGE GND. | TERMINALS 2ND. STAGE NEG. | TRANSFER 1ST. STAGE SENSE | TRANSFER 1ST. STAGE DELAY | TRANSFER 2ND. STAGE SENSE | TRANSFER 2ND. STAGE DELAY | OVERALL SENSE | OVERALL DELAY |
|---|---|---|---|---|---|---|---|---|---|---|
| 1 | α | β | γ | δ | DIRECT | 0 μs | DIRECT | 0 μs | DIRECT | 0 μs |
| 2 | β | α | δ | γ | REVERSE | 0 μs | DIRECT | 0 μs | REVERSE | 0 μs |
| 3 | α | β | γ | δ | DIRECT | 0 μs | REVERSE | 2 μs | REVERSE | 2 μs |
| 4 | β | α | δ | γ | REVERSE | 0 μs | REVERSE | 2 μs | DIRECT | 2 μs |

INVENTORS
JOHN HAYS HAMMOND, JR.
& ELLISON S. PURINGTON
BY
[signature]
ATTORNEY

INVENTORS
JOHN HAYS HAMMOND, JR. AND
ELLISON S. PURINGTON
BY
ATTORNEY

Nov. 22, 1960 J. H. HAMMOND, JR., ET AL 2,961,481

SECRECY TELEVISION

Filed Dec. 30, 1954 20 Sheets-Sheet 20

INVENTORS
JOHN HAYS HAMMOND, JR. AND
ELLISON S. PURINGTON
BY
ATTORNEY 2,961,481

SECRECY TELEVISION

John Hays Hammond, Jr., % Hammond Research Corporation, Gloucester, Mass., and Ellison S. Purington, Gloucester, Mass.; said Purington assignor to said Hammond Filed Dec. 30, 1954, Ser. No. 478,568

4 Claims. (Cl. 178—5.1)

This invention relates to secrecy television, and more particularly to apparatus for the encoding of television signals for transmission and for the decoding of these signals for picture reproduction.

One object of the invention is to provide a secrecy system for subscription television. In such a system the television programs are broadcast in scrambled form to render the signal unintelligible to non-subscribing members of the public. Subscribers to the programs are provided with decoding apparatus to be incorporated into their television receivers, thereby permitting reception of clear pictures.

Another object of this invention is to provide a secrecy television system using codes that may be easily and frequently changed, thereby enabling television stations to police their transmissions and to guard against program reception by non-subscribers.

Still another object of the invention is to provide a secret system of communication in which the message to be transmitted is encoded in one of a plurality of ways designated by code symbols, and is decoded at the receiver only when the receiver is set to correspond to the same code symbols.

Another object is to provide improved apparatus for encoding television signals for transmission and for decoding these signals for reception.

In accordance with the present invention the encoder may operate by any one or more of several methods. It may, for example, provide horizontal offset for some of the lines which make up the television picture. This may be likened to splitting the picture into a number of narrow horizontal strips and then moving some of these strips somewhat to the side. A second method is that of sense reversal, in which selected horizontal lines making up the televised picture are reversed in polarity, and as a result the black areas become white and the white areas become black in the selected lines. A third method consists of making vertical transpositions of some of the lines. This may be likened to removing certain horizontal strips from their normal position in the picture and interchanging them with other strips further down in the picture.

According to this invention, the television transmitter is provided with circuits which will modify the video signal of certain scanned lines determined by a coding sequence established by a horizontal pulse-controlled counter circuit and a manual pre-setting switch network. The video signal may be modified by passing it through signal delay circuits which would result in horizontal offset of lines; or by passing it through a phase reversal apparatus which would result in black-white sense reversal; or by impressing lines of video signal upon a storage device and recovering them in a different order, thus resulting in a vertical transposition of lines. Any of these coding means may be used singly or in combination with one or more of the other coding means.

The counter generates triggering pulses which appear in an established sequence at its several stages or output circuits. The several output circuits of the counter are coupled to the several signal modifying circuits by the manual switching network making it possible to trigger any particular signal modifying circuit from any particular counter output circuit. Many possible combinations of switching exist between the various signal modifying circuits and the counter output of circuits, and each combination determines a coding sequence for modifying the video signal in the successive scanned lines.

In the transmitter, a marker pulse is generated and transmitted during the vertical blanking interval between the scanning of successive frames. The marker pulse is indicative in the transmitter of the starting time of the triggering sequence of pulses generated by the counter circuit and coded by the switching network. In the receiver, the marker pulse is received and is impressed upon a similar counter circuit that established a sequence and generates pulses which pass through a decoding switching network. The decoding sequence of triggering pulses from the receiver decoding network will correspond to the coding sequence of the transmitter, and these pulses applied to trigger video signal-modifying circuits, cause the lines of video information to be modified in a manner that is complementary to the transmitter's modification or scrambling.

In brief, the transmitter of the television system modifies various lines of video information according to a coding sequence, the starting time of which is indicated by a marker pulse. In the receiver, the marker pulse establishes the starting time of a corresponding decoding sequence, to modify the lines of video information in a complementary manner.

Other features of this invention will become apparent from the following description taken in connection with the accompanying drawings in which:

Figure 1 is a block diagram of a television transmitter for a television system embodying this invention, using the horizontal offset (HO) method of video encoding;

Figure 1*a* is a block diagram similar to Fig. 1 but using the sense-reversal (SR) method of encoding;

Figure 2 is a block diagram of a television receiver adapted to decode and reproduce pictures transmitted by the transmitter system of Fig. 1;

Figure 2*a* is a block diagram of a television receiver adapted to decode and reproduce pictures transmitted by the transmitter system of Fig. 1*a*.

Figure 13 is a graph of waveforms appearing in circuit 800 which will aid in the understanding of the production of the lengthened vertical blanking pulse.

Figure 16 is a schematic diagram of scrambling circuit 500, which is one embodiment of the invention by which the combination of horizontal offset and sense reversal types of scrambling may be accomplished.

Figure 1:
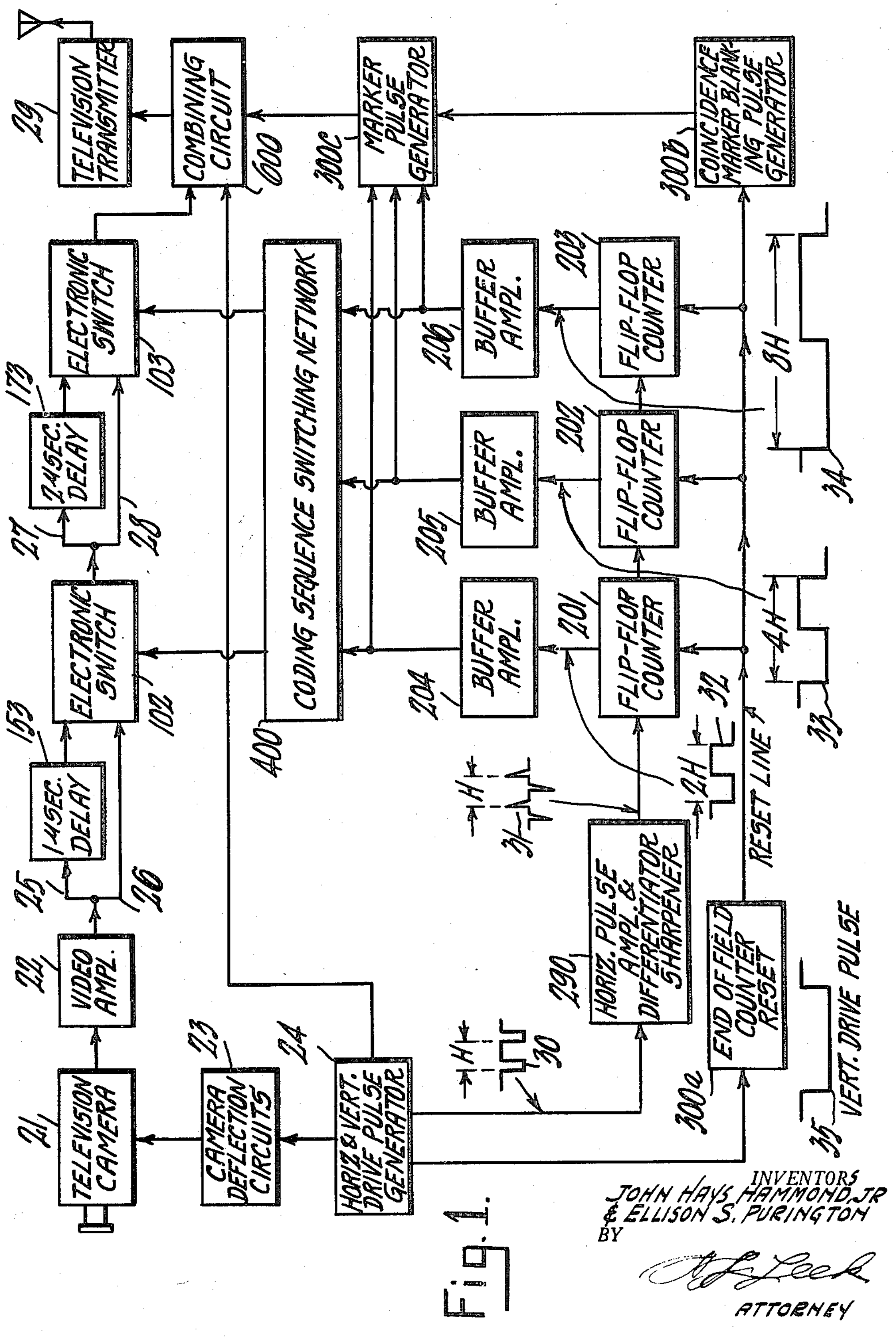
Figure 1D:
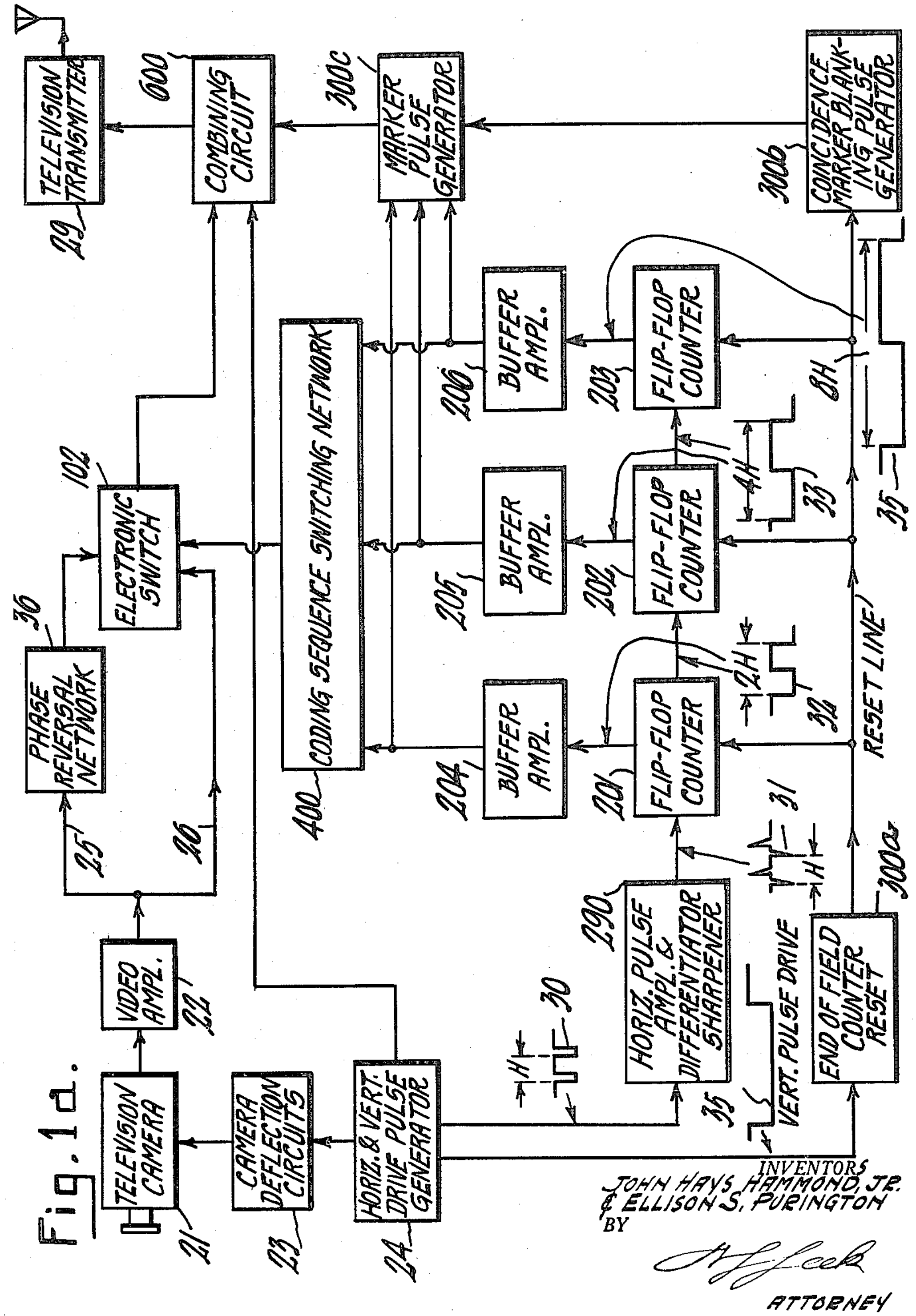

In the drawings the reference numbering system is as follows:

(1) Reference by an identical number in different figures indicates the same element or component;

(2) Numbers from 21 through 99 refer to miscellaneous items;

(3) Numbers in the 100's refer to elements within the electronic switch of the horizontal-offset method;

(4) Numbers in the 200's refer to elements within the binary counter and buffer-amplifier circuits;

(5) Numbers in the 300's refer to elements within the counter-reset and marker-generator circuits of the transmitter;

(6) Numbers in the 400's refer to elements within the coding-sequence switching network;

(7) Numbers in the 500's refer to elements within the sense reversal circuits;

(8) Numbers in the 600's refer to elements within the signal combining circuit of the transmitter;

(9) Numbers in the 700's refer to elements within the signal separating circuits of the receiver;

(10) Numbers in the 800's refer to elements within the reset pulse and blanking pulse generator circuits of the receiver;

(11) Numbers in the 900's refer to elements within the output combining circuit of the receiver.

The electronic operation which performs the decoding at the receiver is identical to that in the transmitter. The only difference is the order in which the decoding sequence switching network 400 is set. This order or arrangement is set up to cause the electronic switches in the receiver to operate in a precisely complementary time relationship with respect to the electronic switches in the transmitter. The switching arrangement, as has been mentioned earlier, can be controlled by a system of punched cards, or any other means for actuating a series of mechanical switches. If punched cards are used all that is required is that the card for the receiver be so punched with respect to the punching of the transmitter card that the switching arrangement produced by the cards be complementary to each other.

The following circuits are identical in both transmitter and receiver:

(1) Electronic switching circuit 100.

(2) Counter circuits 201, 202, 203.

(3) Buffer circuits 204, 205, 206.

(4) Phase reversal circuit 36.

(5) Coding sequence switching network 400.

(6) Combination scrambling circuit 500.

Referring more in detail to Figure 1, there is shown the block diagram of a secrecy television transmitter in which a video signal is obtained from a suitable pickup device such as a television camera 21, and is amplified by an amplifying circuit 22. The video signal is passed to a first electronic switch 102 by two paths 25 and 26. In path 25 the signal is delayed one microsecond by a delay circuit 153. The electronic switch 102 selects the delayed signals from the path 25 or the undelayed signals from the path 26 in accordance with coding pulses received from a switching network 400. The signal selected by the first electronic switch 102 is passed to a second electronic switch 103 by two paths 27 and 28. Again one path 27 contains a delay circuit 173, but in this case the signal experiences a delay of two microseconds. The second electronic switch 103 selects signals which are delayed or are undelayed in accordance with coding pulses received from the switching network 400. The delay times may have any suitable values, the one and two microseconds delay times being used as an example.

The electronic switches 102 and 103 may pass the video signal from the camera 21 and amplifier 22 to the transmitter 29 in any of the four modes: the signal will be undelayed if passed via paths 26 and 28; it will be delayed one microsecond if passed via paths 25 and 28; it will be delayed two microseconds if passed via paths 26 and 27; or it will be delayed three microseconds if passed via paths 25 and 27. It will be appreciated that additional electronic switches having alternate paths for selectively modifying lines of video signal may be inserted between the amplifier 22 and the transmitter 29.

Figure 1 shows apparatus for selectively delaying lines of video to achieve scrambling by horizontal offset, and Figure 1*a* shows apparatus for reversing the phase of the video signal of selected lines in accordance with the pulse sequence established by the switching network 400.

Horizontal-drive pulses 30 and vertical-drive pulses 35 are generated by appropriate apparatus 24 and used by the camera deflection circuits 23. The horizontal-drive pulses 30 are amplified and differentiated by a circuit 290 giving pulses 31 which are then applied to a first binary-counter circuit 201. This circuit generates square waves having one half of the horizontal scanning frequency. The first counter 201 furnishes an output waveform 32 to a second counter 202. The second counter 202 generates an output waveform 33 of half the frequency of its input wave 32 or one quarter of the line scanning frequency. This wave 33 is applied to a third counter 203 which in turn generates an output wave 34 of one half the frequency of its input or one-eighth of the line-scanning rate.

The square-wave outputs of the three counters 201, 202 and 203 are passed through buffer amplifiers 204, 205 and 206 to the switching network 400. The switching network 400 is a manually operated device and may consist of a plurality of plugs and jacks such that any particular electronic switch may be connected to the buffer circuit associated with any particular counter.

The pulse output or square waves appear in a binary sequence at the output circuits of the counters, with each counter operating at half the frequency of the preceding one. The switching network 400 receives a binary sequence of pulses from the counters, and, by means of the various possible connections, a coding sequence is furnished to the electronic switches and video-signal modifying circuits. The complexity of possible coding sequences is determined by the number of counter circuits and by the number of signal-modifying circuits with attending electronic switching circuits.

Since the counter circuits are triggered from the horizontal synchronizing pulses, all of the counter operations and all of the electronic switching are accomplished during periods of horizontal blanking between the intervals of the line scanning. Therefore the video-signal modifying circuits are operative for periods of one or more complete scanning lines.

It is further desirable to commence the coding sequences anew with each successive frame, and this is accomplished by a counter-reset circuit 300*a*. During the interval of vertical blanking between frames, the counter-reset circuit 300*a* stops the operation of the counters 201, 202 and 203 and the counter operation is re-commenced from a pre-determined initial condition not dependent upon the condition of the termination for the preceding frame. At the beginning of each new sequence of counter pulses, the marker pulse for synchronizing the transmitter and receiver counters is generated by an appropriate circuit 300*c*. This marker pulse along with the horizontal and vertical sync and blanking pulses are combined by a suitable circuit 600 with the scrambled video signal to form the composite video signal shown in Fig. 4. This composite wave is then fed to the transmitter 29 where it modulates the carrier wave.

Figure 2:
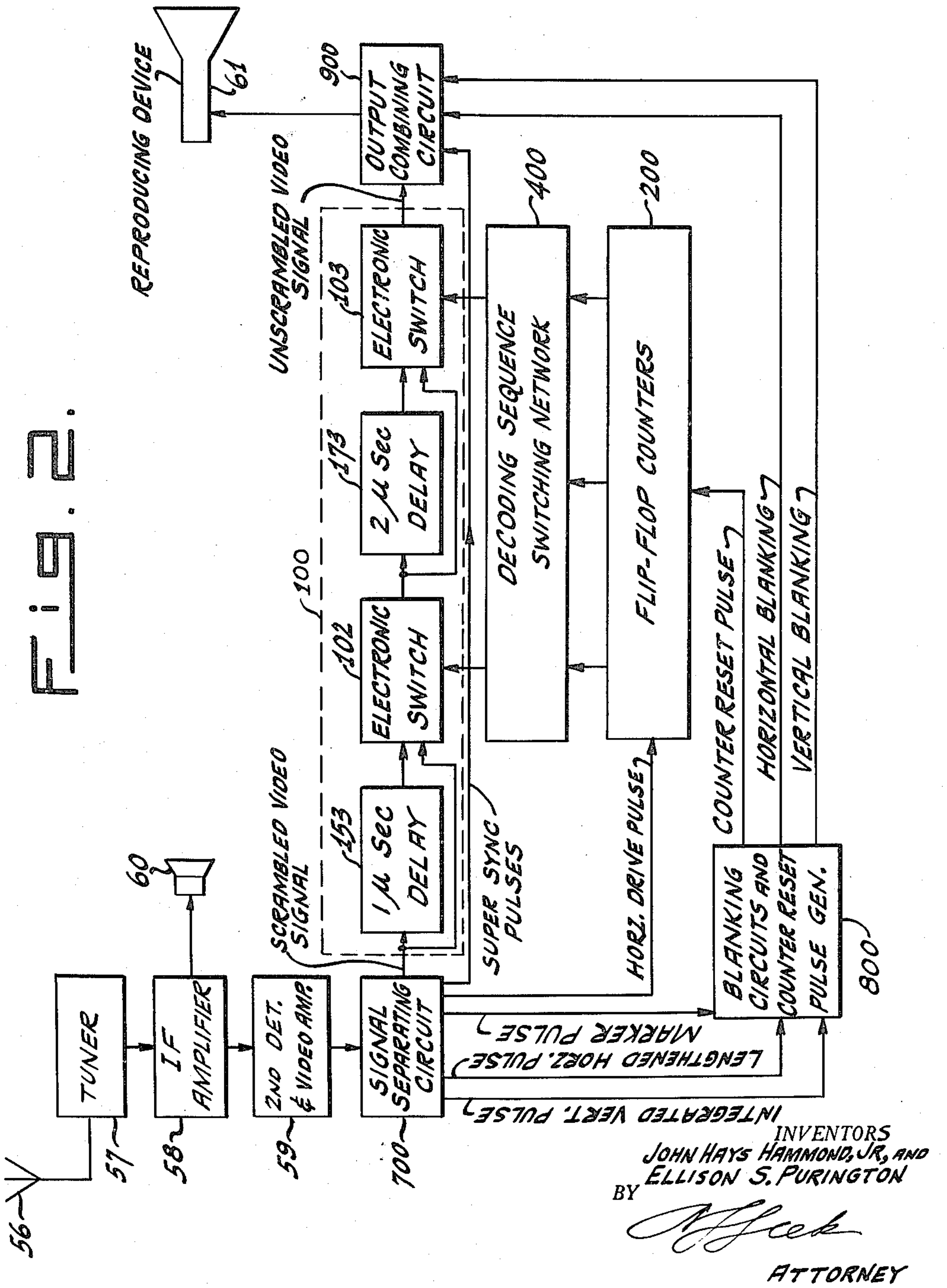

Figure 2 shows a television receiver having a decoding circuit using the horizontal-offset method according to the teachings of this invention. Signals are received as in a conventional receiver by means of an antenna 56, a tuner 57, an intermediate-frequency amplifier 58, and a video second detector 59. A sound channel is indicated by a speaker symbol 60. The composite signal is separated by an input-segregating circuit 700, and the coded video signals are impressed upon decoding apparatus including delay circuits 153 and 173, and electronic switches 102 and 103 which can select either delayed signals or undelayed signals from alternate paths.

The decoding apparatus operates similarly to the signal-modifying circuits of the transmitter previously discussed in regard to Fig. 1. Binary counters 204, 205 and 206 are triggered by horizontal synchronizing pulses and the reset pulse generated from the marker pulse by reset pulse generator 800. Thus a pulse sequence is established at the counter output circuits which is the same as in the transmitter.

A decoding sequence results when switches of a network 400 are set to correspond in a complementary manner to the switching arrangement of network 400 of the transmitter. The settings of switches may be accomplished in a manner such as inserting a punched card in a device to make various contacts.

When the decoding sequence of pulses is applied to the electronic switches 102 and 103, the video signal is modified by circuits 153 and 173 in a manner complementary to the modification introduced by the transmitter. In the case of modification by signal delay, the signal is decoded by causing the same final delay of all of the scanned lines: if a line of video signal is delayed two microseconds by the transmitter, the receiver must delay it one microsecond; if a line is undelayed in the transmitter, it must be delayed three microseconds in the receiver; etc.

To ensure that the counters in the receiver keep in step with those of the transmitter, an electronic timing circuit 200 causes the counting operation of circuits 204, 205 and 206 to be interrupted by the vertical-blanking pulses and to be re-established in a predetermined initial condition upon receipt of the reset pulse derived from the marker pulse.

The decoded videosignal is combined with vertical and horizontal blanking pulses by the combining circuit 900 and may then be reproduced in a kinescope 61. It is important to note that electronic switches 102 and 103, timing circuit 200, and switching network 400 are identical in both transmitter and receiver.

Figure 2A:
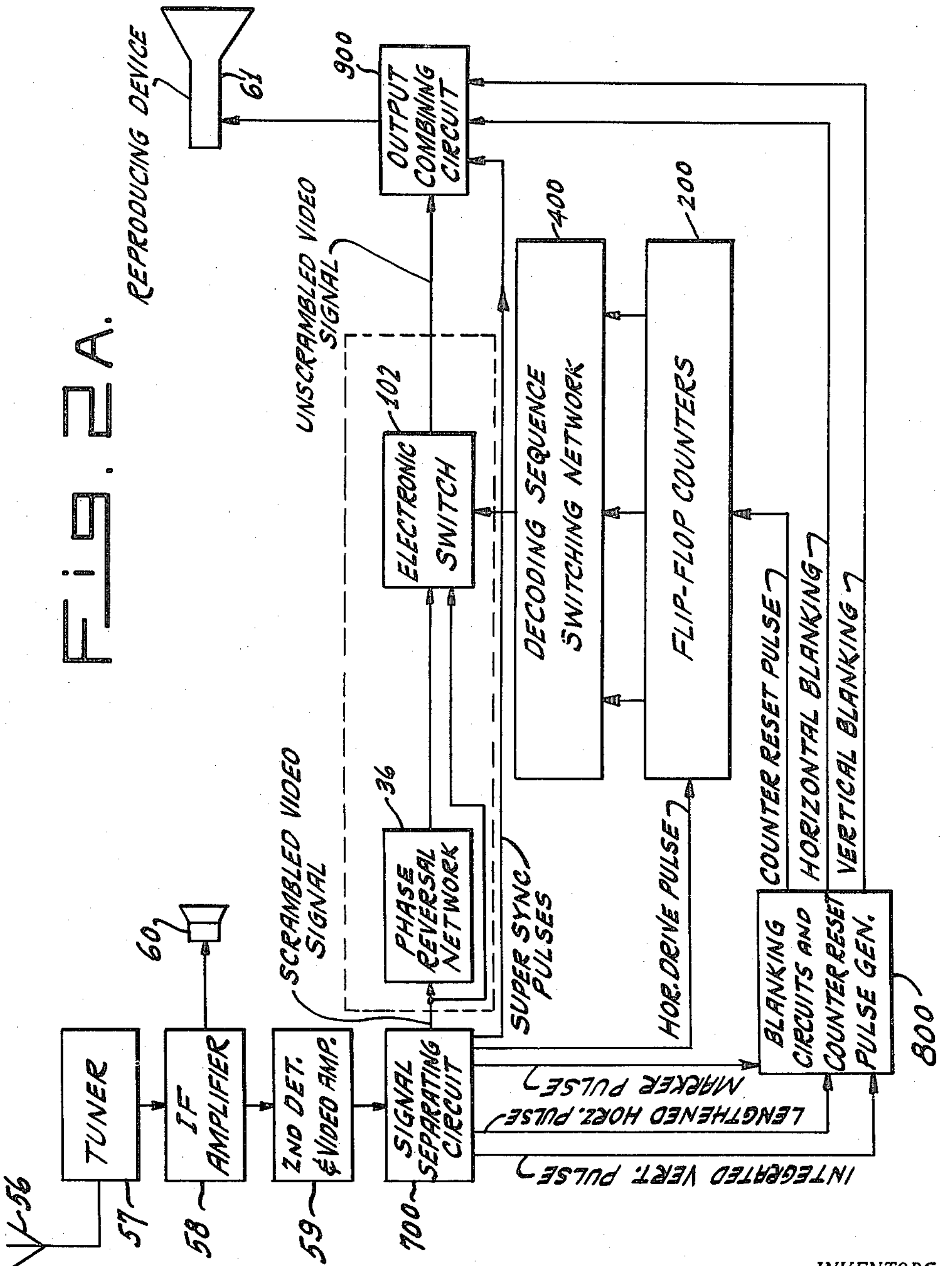

Fig. 2*a* shows in block form a receiver similar to that of Fig. 2 except that it has a phase reversal network 36 in the video line instead of the delay circuits. It is intended to unscramble the phase reversal type of scrambling in a manner similar to that in which the receiver of Fig. 2 unscrambles a video signal scrambled by the horizontal-offset method.

Figure 3:
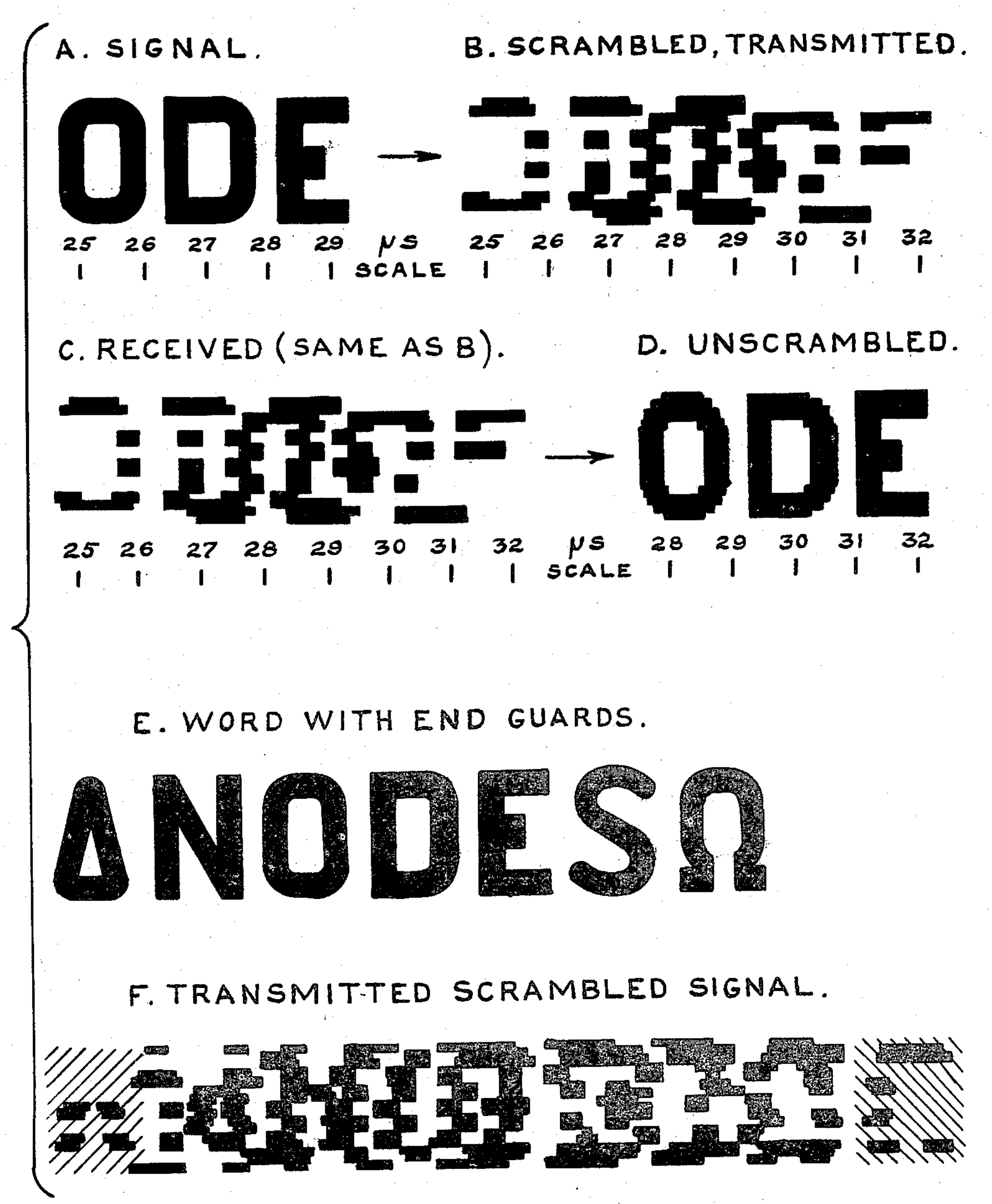
Figure 3 is a chart illustrating the manner in which a television picture may be scrambled and unscrambled using the principle of horizontal offset of the scanned lines.

Figure 3 illustrates the method of scrambling and unscrambling a picture by means of horizontal offset. For purpose of illustration a single word "ODE" is representative of a small portion of the complete televised picture. In Fig. 3(*a*) the original word is plotted over a horizontal scale representative of the position of the transmitter scanning means in a time scale of microseconds, the scanning means commences to scan the word "ODE" after traveling for 25 microseconds from the left side of the picture. By delaying various lines of the video signal, various strips of the picture are horizontally offset by one, two, or three microseconds, thereby producing the scrambled picture of Fig. 3(*b*). Fig.3(*c*) shows the scrambled picture as received, and Fig. 3(*d*) shows the unscrambled picture when the receiver delays the video signal in a complementary manner and every line has then been delayed a total of three microseconds. It will be noted that the scanning means of the receiver commences to reproduce the word "ODE" after scanning for 28 microseconds from the left side of the picture. Since this illustrates an enlargement of the original picture, the slight irregularities in the formation of the word will not be noticeable in view of the sharpness or definition presently obtainable in a reproduced picture. Fig. 3(*e*) shows end guards on a line and Fig. 3(*f*) shows the line of Fig. 3(*e*) after scrambling. If the slant-hatched portions are blanked out no clue as to the sequence of line delay may be discerned, thereby increasing the degree of secrecy.

Figure 4:
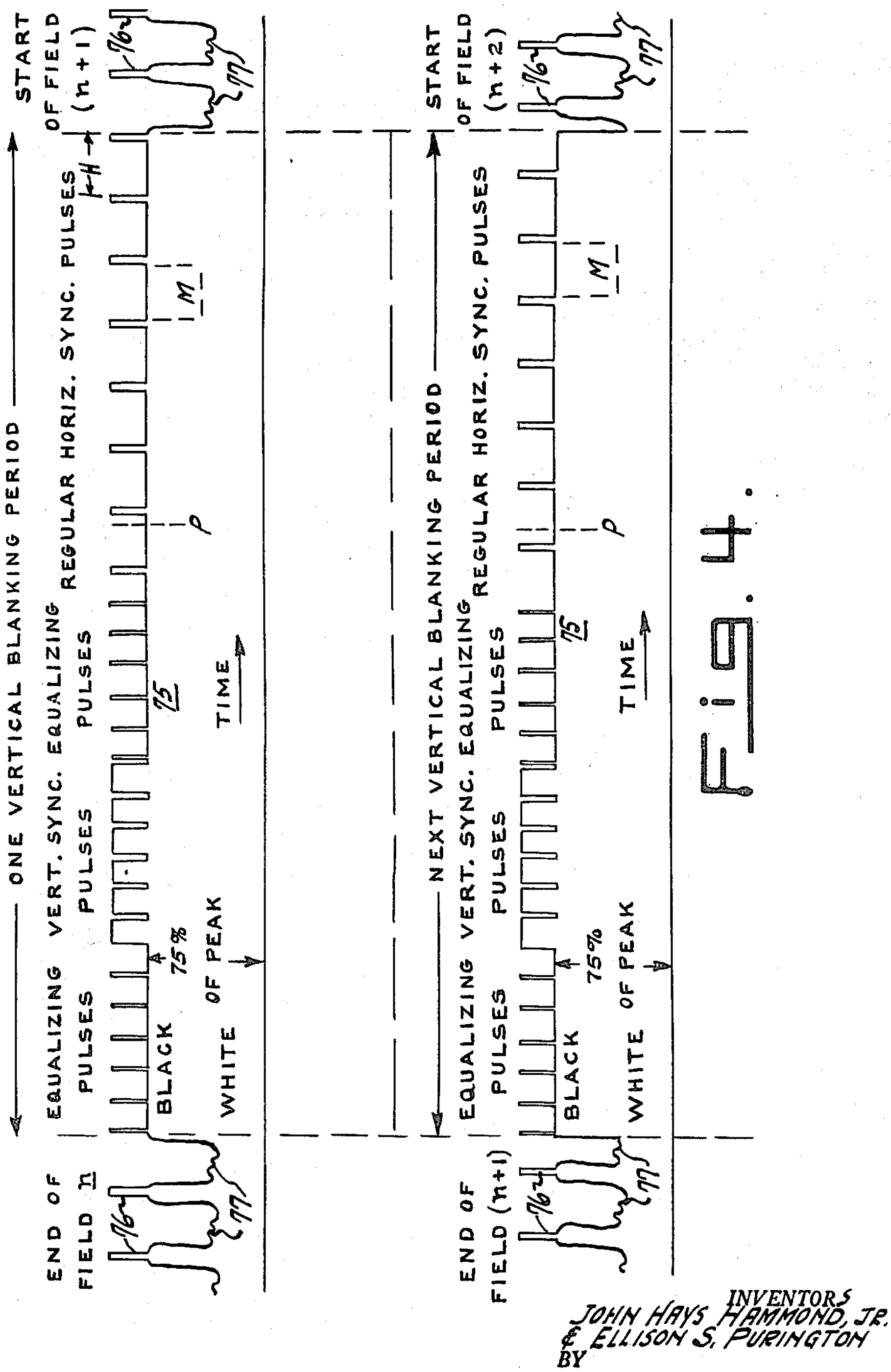
Figure 4 shows the wave forms of the television signals including the vertical blanking and marker pulses in two successive fields.

Figure 4 shows the waveform of two successive fields of a transmitted television signal, and more particularly it shows the waveform during intervals of vertical blanking between successive fields. Before and after the vertical blanking pulse 75, the horizontal blanking and synchronizing pulses 76 appear between the scanned lines of video signal 77. Synchronizing and equalizing pulses appear upon the vertical blanking pulses 75. Because of the need for line interlace of successive fields, there is one more equalizing pulse in the waveform of the first trace of Fig. 4 than in the second trace. In the secrecy television transmitter the counter circuits commence anew their sequence of pulses at times dependent upon the time of the next horizontal drive pulse after the ends of a marker-blanker pulse. The end of the marker-blanker pulse is indicated by the dashed line *p* in Fig. 4. The transmitter counters operate with each horizontal synchronizing pulse following the reference line *p*, and after a predetermined number of pulses (four pulses in Figure 4), the counter circuit attains the initial condition of the coding sequence and a marker pulse M is generated and transmitted between a pair of horizontal synchronizing pulses. The marker pulse M, shown by dashed lines in Fig. 4, may make a negative excursion into the vertical blanking pulse 75. The exact timing of the marker pulse M with respect to the vertical blanking or the equalizing pulses is unimportant since its function is merely to indicate a predetermined initial condition in the sequence of counter coding pulses to permit the counters of the receiver to establish the starting time of a corresponding decoding sequence of pulses.

Figure 5:
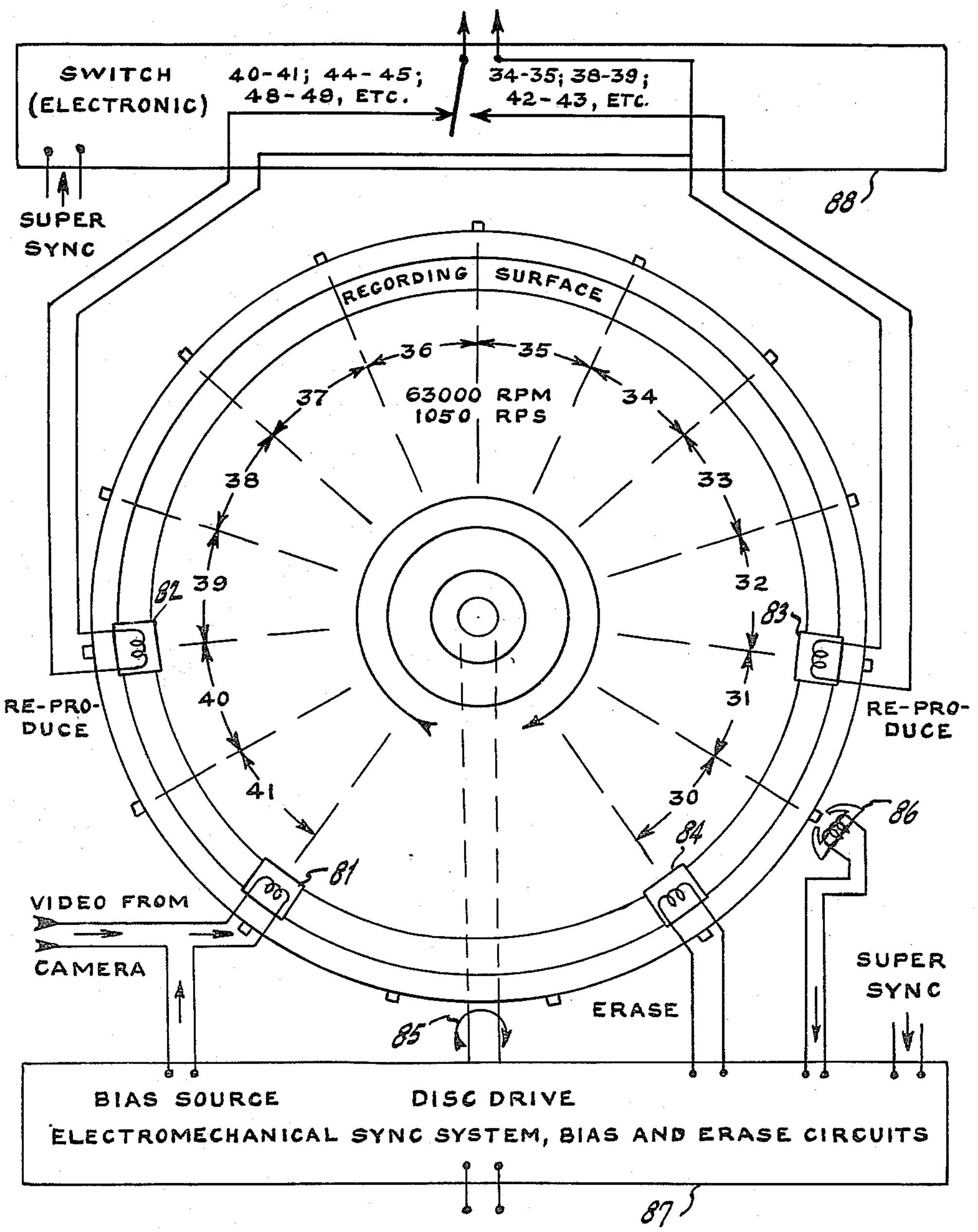
Figure 5 illustrates apparatus for storing lines of video information and for reproducing them in a scrambled sequence to obtain line transposition in the transmitted picture.

In addition to the methods of scrambling by horizontal offset (HO) of the scanned lines and by sense reversal (SR) of the scanned lines, the method of scrambling by vertical offset (VO) or line transposition may be attained by using a storage device such as shown in Fig. 5. Fig. 5 shows magneto-mechanical memory system wherein a magnetic recording surface 80 is placed on a rotatable member such as a disc. A recording head 81, two or more pick-up heads 82 and 83 and an erasing head 84 are appropriately spaced about the recording surface 80.

The disc has a drive arrangement 85 and a super-synchronizing mechanism 86 to insure that it rotates at a speed which bears a proportional relationship to the line scanning rate of 15,750 cycles per second. In the particular embodiment of this invention shown by Fig. 5, the disc rotates at 1,050 revolutions per second which is one-fifteenth of the line scanning rate. To accomplish the proper synchronizing of the rotating disc appropriate circuits 87 are provided.

In the operation of the line-sorting disc of Fig. 5, the video signal from a camera or other pickup device is impressed upon the recording head 81. The magnetic surface containing the stored signal rotates past the first pickup head 82 and then at a later interval it rotates past the second pickup head 83. The pickup heads 82 and 83 are controlled from an electronic switch 88 such that only one pickup head is operative at any particular time. A line of video signal is recorded by the recording head 81 and then is recovered by either the first pickup head 82 or the second pickup head 83 depending upon the electronic switch 88, which in turn depends upon the coding sequence developed by the counter circuit not shown in Fig. 5.

To understand more clearly the timing involved in the disc storage device of Fig. 5, it will be assumed that at the given moment the camera has completed the scanning of its 41st line and is about to scan its 42nd line. At this moment the video signal of line 29 has just been erased in passing the erasing head 84, and line 30 is about to be erased. The first pickup head 82 is now ready to recover the video signal of line 40 and the second pickup head 83 is now ready to recover the video signal of line 32. At this moment, with the camera about to scan line 42, the electronic switch may select for transmission either line 32 or line 40 as dictated by the counter circuits.

Although the foregoing description pertains particularly to the scrambling by vertical transposition of lines in a television transmitter, it will be appreciated that corresponding apparatus in a receiver may accomplish unscrambling by vertically transposing lines in a complementary manner according to the decoding sequence established by the counter circuits.

Figure 6:
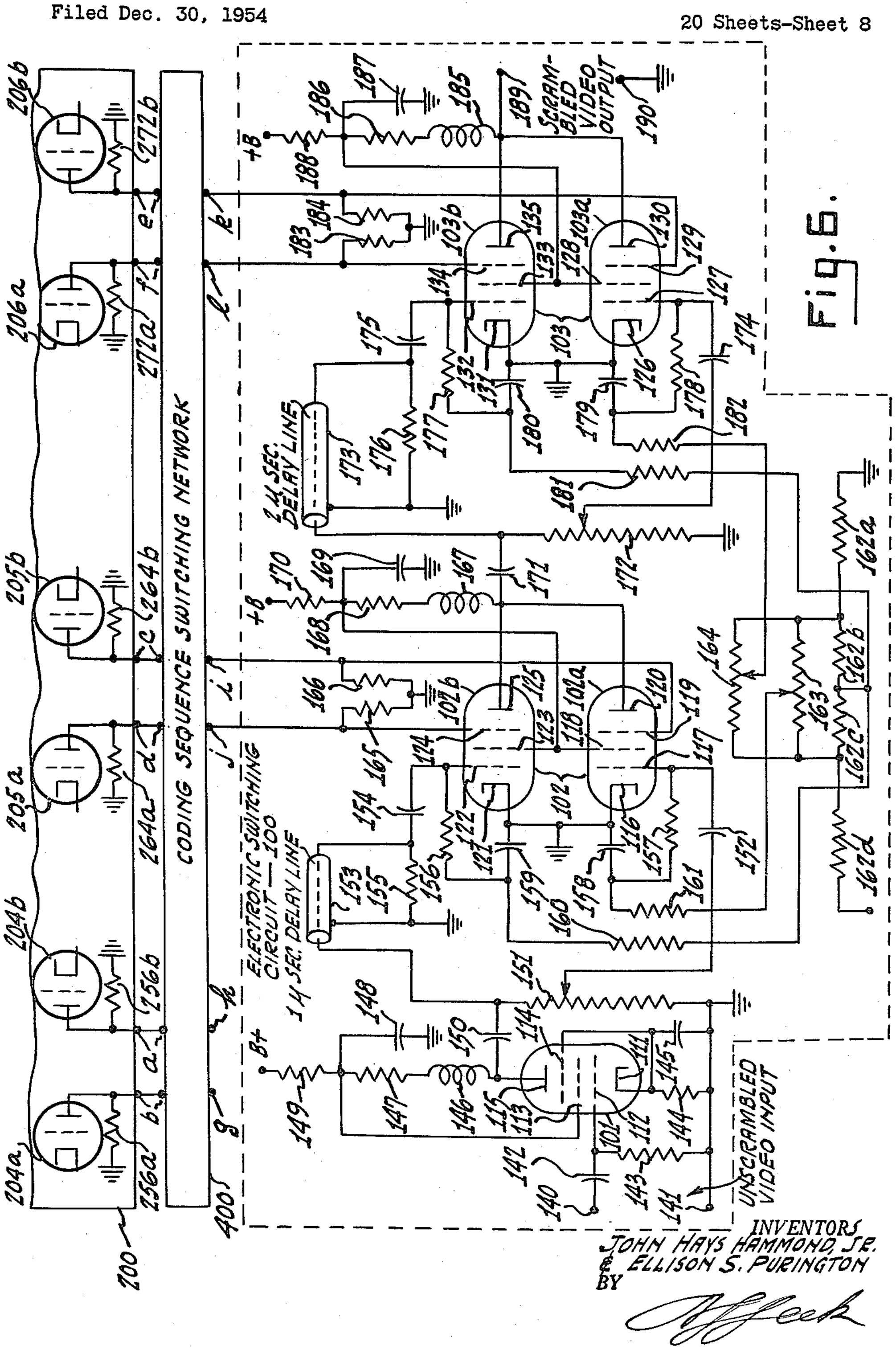
Figure 6 is a detailed schematic diagram of the electronic switch and delay circuits that are indicated as blocks in Fig. 1.

Fig. 6 shows a detailed schematic diagram of the electronic switching circuits which appear as blocks in Figs. 1, 1*a*, 2, and 5. The electronic switches shown in Fig. 6 are associated with delay lines 153 and 173, but it will be appreciated that other signal-modifying apparatus such as a phase-reversal circuit, or the vertical transposition device of Fig. 5 could likewise be used.

*Detailed description of electronic switch*

In Fig. 6, non-scrambled video signals are applied to the grid 112 of the amplifier tube 101 through the coupling capacitor 142 and the grid return resistor 143. Tube 101 is biased by a cathode resistor 144, which is by-passed for video frequencies by a capacitor 145. The screen grid 113 is supplied with B+ potential through a resistor 149 from the high voltage source indicated at terminals B+, and is by-passed for video frequencies by a capacitor 148. Potential for the anode 115 is supplied through a resistor 149 from B+ potential, through a load resistor 147 and a series video-peaking inductance 146. Amplified video output from the tube 101 is developed across a potentiometer 151 through a coupling capacitor 150. From here the video signal follows two paths:

(1) From the variable tap on the potentiometer 151 through a coupling capacitor 152 to the grid 117 of the pentode 102*a*, and (2) Through a one-microsecond delay line 153 and through a coupling capacitor 154 to the grid 122 of pentode 102*b*.

By adjustment of the potentiometer 151 the signal amplitude applied to the grid 117 of the tube 102*a* can be made exactly equal to the delayed signal amplitude applied to the grid 122 of the tube 102*b*. Thus both grids receive identical signal except that the signal reaches grid 122 exactly one microsecond later than it reaches grid 117.

Means are provided as follows for equalizing the grid bias to the control grids of the tubes 102*a* and 102*b*, and for equalizing the grid bias to the control grids of the other pair of tubes, 103*a* and 103*b*. Resistor network 162*a*, 162*b*, 162*c* and 162*d*, is a voltage divider which is supplied with potential which is negative with respect to ground. This voltage divider supplies grid bias to the switching-tube pairs 102*a*, 102*b*, 103*a* and 103*b*. The junction point between the resistors 162*b* 162*c* establishes the potential for biasing the switching tube 102*b* through its grid return resistor 156 and isolation resistor 160, and to the tube 103*b* through its grid return resistor 177 and isolation resistor 181. One end of the potentiometer 163 is connected to the junction of the resistors 162*a* and 162*b*. The other end of the potentiometer 163 is connected to the junction of the resistors 162*c* and 162*d*. Thus the center point of the potentiometer 163 is at the same potential as the junction of the resistors 162*b* and 162*c*, which has already established the bias potential for the tubes 102*b* and 103*b*. The second potentiometer 164 is connected in parallel with the first potentiometer 163. The arm of the first potentiometer 163 supplies bias potential to the grid 117 of the tube 102*a* through its isolation resistor 161 and grid return resistor 157. Similarly the arm of the second potentiometer 164 supplies bias potential to the grid 127 of the tube 103*a* through its grid return resistor 178 and isolation resistor 182. It can thus be seen that by adjusting the arm of the first potentiometer 163, the bias potential on the tube 102*a* may be adjusted to bring its conduction current into exact balance with the current through the tube 102*b*. Similar adjustment of the second potentiometer 164 brings the conduction current of the tube 103*a* into exact balance with the current through the tube 103*b*. The anodes 120 and 125 of the switching amplifier tubes 102*a* and 102*b*, respectively, are supplied with B+ potential through a resistor 170, a load resistor 168 and a series video-peaking inductance 167. The screen grids 118 and 123 of these tubes are both supplied with B+ potential through a resistor 170 and are by-passed for video frequencies by a capacitor 169. The switching action of this tube pair is effected by the absence or presence of negative cut-off potential applied to the suppressor grids 119 and 124. The suppressor grids of the switching-tube pair are connected through the coding-sequence switching network 400, to be described in detail later, to the anodes of a switching-amplifier pair, for example 205*a* and 205*b*, also to be described later. If the tube 205*b* is conducting and 205*a* is non-conducting, the suppressor grid 119 of the tube 102*a* will be depressed to a potential sufficiently negative with respect to ground to stop conduction of the tube 102*a*, while the suppressor grid 124 of the tube 102*b* will remain at ground potential allowing normal conduction of the tube 102*b*. As the conduction state of the switching-amplifier tube pair reverses and the tube 205*a* becomes conducting, its anode potential and thus the potential on the suppressor 124 of the tube 102*b* is now depressed to substantially the same negative potential as the suppressor 119 of the tube 102*a* was in the previous conduction state, thus now stopping conduction in the tube 102*b*. The suppressor 119 of the tube 102*a* is now at ground potential because the tube 205*b* is nonconducting, thus allowing conduction through the tube 102*a*. It can thus be seen that through this electronic switching action in the tubes 102*a* and 102*b*, the output signal developed across the potentiometer 172 through the coupling capacitor 171 will encounter no delay when passing through the tube 102*a*, but will be delayed one microsecond while following the path through the tube 102*b*.

The operation just described for switching-tube pair

102*a* and 102*b* is identical to that for switching pair 103*a* and 103*b* except that the signal reaching the grid 132 of the tube 103*b* is delayed two microseconds compared to that reaching the grid 127 of the tube 103*a* instead of the one microsecond differential encountered in the first switching pair 102*a* and 102*b*. Thus we have described means by which an unscrambled video signal can follow four different paths, each path differing in amount of delay time, such that delays of 0, 1, 2 and 3 microseconds can be encountered. It is also apparent that the signal paths or routes are changed by the action of the switching amplifiers as controlled by the horizontal-drive pulses, thus synchronizing the route changes with the ends of the scanning lines.

*Detailed description of counter circuits*

As was previously stated, the electronic switching action is controlled by a three-stage flip-flop counter driven by the horizontal-driving pulses.

Figure 7:
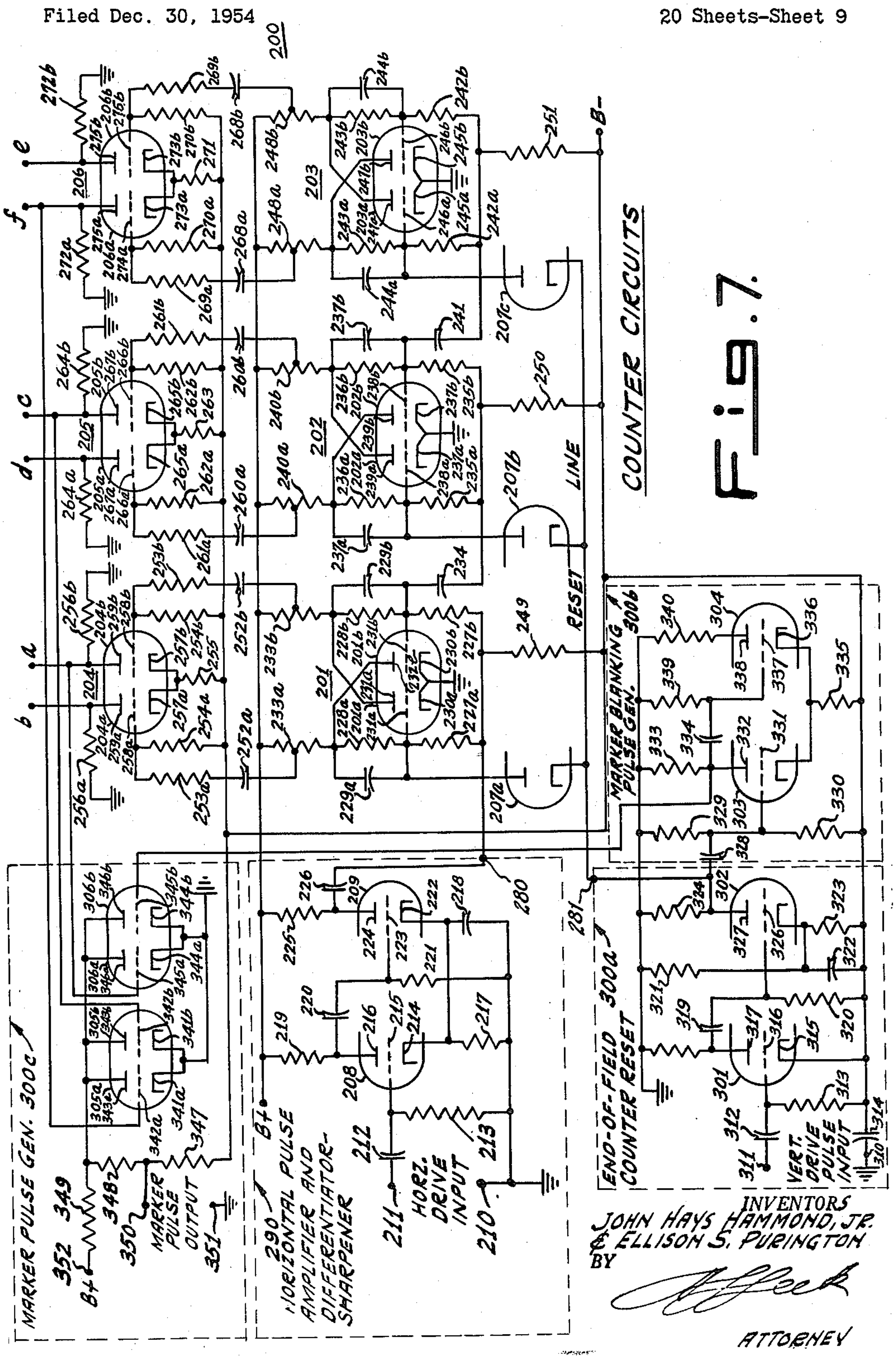
Figure 7 is a detailed schematic diagram of the counter circuits, the buffer amplifiers, and the marker-pulse generating circuit which are shown as blocks in Fig. 1.

Fig. 7 shows the detailed schematic diagram of the counter circuits, the buffer amplifiers and the marker-pulse generator. In Fig. 7, the tubes 208 and 209 constitute a horizontal-pulse amplifier for amplifying the drive pulses from the sync-signal generator such as RCA model MI–26920, to assure sufficient amplitude for triggering the first counter in the chain. The horizontal pulses are applied to the terminals 210 and 211, and are fed to the grid 215 of the tube 208. The input pulses are negative going, so that at the anode 216 of the tube 208 we find amplified positive-going pulses which are then fed to the grid 223 of the tube 209. We thus find further amplified and negative-going pulses appearing at the anode 224 of the tube 209. These pulses are differentiated by the capacitor 226, thus supplying the first stage 201 of the counter chain with sharp negative-going pulses.

Each stage of the counter system is a bi-stable trigger circuit of the Eccles-Jordan type which is well known. They are shown for example by Grosdoff in the RCA Review of September 1946, page 439, Fig. 1, Form C. An explanation of the operation of this trigger circuit is described in considerable detail in "Theory and Applications of Electronic Tubes," by Herbert J. Reich, published 1939 by McGraw-Hill, on page 353.

This type counter will not reverse its conduction state on the receipt of positive pulses and therefore the positive-going pips of the differentiated drive pulses will not affect the operation. The first stage of the counter, however, will reverse its conduction state on the receipt of every negative-going differentiated pulse. The second stage of the counter chain is coupled to the first stage through a capacitor 234. Since the trigger circuits will not respond to positive input pulses, the second stage trigger will reverse its conduction state only when stage 1 changes to the state in which side *a* becomes conducting, thus causing a negative pulse to be transmitted to the second stage.

Since side *a* of the first stage becomes conducting with the receipt of every second horizontal pulse or count, it is evident that stage 2 reverses its conduction state with the receipt of every second count.

The action of the third stage is initiated by the second stage in a manner identical with that by which the second-stage action is initiated by the first stage, and from this it will be apparent that the third-stage trigger reverses its conduction state at every fourth count.

Each stage of the counter chain is capable of providing controlling potentials for an electronic switch of the type previously described in Fig. 6. This is so because of the controlled polarity reversal of the potential difference between the two anodes in each stage. It is this reversal in polarity which is used to reverse the conduction state of the electronic switch. A buffer amplifier is used with each counter stage to permit the switching potentials to be applied to the suppressor grids of the switching amplifiers and also to isolate the counter tubes from the switching tubes. The buffer amplifier or switch-control amplifier comprises two triodes connected in push-pull, e.g., as shown in the tubes 204*a* and 204*b*. The positive ends of the anode load resistors 256*a* and 256*b* are at ground potential. The positive end of the anode supply for tubes 204, 205 and 206 is also at ground potential and the cathodes 257*a* and 257*b* are connected to the negative end of the anode source through the cathode-biasing resistor 255. This circuitry permits the anodes of the switch-control (buffer) amplifiers to be connected directly to the suppressor grids of the switching tubes. The switching potentials from the counter stages are derived from a tap on the respective anode load resistors such as 233*a* and 233*b*, and are coupled to the respective grids of the control amplifier through coupling capacitors 252*a* and 252*b*, and resistors 253*a* and 253*b*. When side *a* of the counter stage 201 becomes conducting a negative-going potential on the tap of the load resistor 233*b* causes the grid 258*b* of the tube 204*b* to receive cut-off potential. Simultaneously, side *b* of counter stage 201 becomes non-conductive, thus causing a positive-going potential to appear at the tap of the anode load resistor 233*a*, which is coupled to the grid 258*a* of the tube 204*a* thus causing conduction in that tube. As a result, the anode 259*a* will be at a negative potential with respect to ground while the anode 259*b* remains at ground potential. Since these anodes are directly coupled (through the coding selector circuits) to the suppressor grids of the switching tubes, anode 259*b* will place the suppressor grid connected to it at ground potential and allow conduction through that tube of the switching-tube pair, while the negative potential on the anode 259*a* will also appear on the suppressor grid of its respective switching tube, thus cutting off the conduction within that tube. As the conduction state of the counter stage reverses, this reversal is reflected through the switching-control amplifier reversing its conduction state and thus reversing the conduction state of the switching tube pair.

As was mentioned earlier it is desirable that the scrambling sequence in both transmitter and receiver be identical in every field. This means then, that the counters in transmitter and receiver must be returned to the same conduction state prior to the beginning of each new field. The circuitry shown in the block 300 accomplishes this resetting action and also generates the signal which at the receiver assures that the counters in the receiver are also re-set for the beginning of each new field and are then started off in step with the transmitter counters by the first horizontal drive pulse following the marker pulse M, Fig. 4.

The counter re-setting in the transmitter is effected by the action of the vertical drive pulse, which is amplified by the tubes 301 and 302 in circuit 300*a*, deriving a cut-off signal from the anode 327 of tube 302 which is applied to one side of all counter stages through the diodes 207*a*, 207*b*, 207*c*, thus rendering the counters inoperative for the duration of the vertical-driving pulse time. The vertical pulses are applied to the counter re-set circuitry at the terminals 310 and 311, and are coupled to the grid 316 of the tube 301. For reasons which will become apparent later, the anode potential source for the tubes 301 and 302 has the positive end grounded and therefore the plate load resistors 318 and 324 of the tubes 301 and 302, respectively, also have one of their ends at ground potential.

On the arrival of the negative-going vertical-drive pulse at the grid 316 conduction in tube 301 is cut off, raising its anode potential to ground level and sending a positive-going pulse to the grid 326 of the tube 302. This causes an increased conduction through the tube 302 with the attendant increase in negative potential at the anode 327 of the tube 302 owing to the increased potential drop across the plate-load resistor 324. This negative potential is communicated to one side of each trigger counter through their respective diodes 207*a*, 207*b* and 207*c*, mentioned previously. It can be seen from the polarity of the diodes as shown that a negative-going signal applied to the cathodes of the diodes will cause conduction therethrough, thus effectively connecting the grids of the aforementioned sides of each counter stage to the anode 327 of the tube 302. This results in the cut-off of one side of each trigger stage for the entire duration of each negative-going vertical drive pulse, and at the instant the trailing edge of the vertical pulse passes, the potential at the anode 327 of the tube 302 rises toward ground or zero potential releasing the counters in the transmitter in order that they may start a new counting cycle on the receipt of the next horizontal pulse.

As has been mentioned before it is desired to transmit to the receiver an identification or marker signal to keep the receiver counters in step with those at the transmitter. The circuit which generates this signal comprises a marker-blanking pulse generator 300*b* comprising tubes 303 and 304, and the coincidence cut-off tube circuit 300*c* comprising tubes 305 and 306. The marker signal generated is a positive-going pulse derived across terminals 350 and 351 at the coincidence time when tubes 305*a*, 305*b*, 306*a* and 306*b* are all non-conducting. The cathodes of these four tubes are all at ground potential and their anodes are all in parallel having a common anode load resistor 349. The time when these tube sections are all four non-conducting is explained as follows:

The control potential for the grids of three of the four coincidence tubes is derived by a direct connection to the anodes of one side of each switch-control amplifier stage, say for example, as shown in diagram 7 side *a* of the switch pair 204, side *c* of the switch pair 205, and side *f* of the switch pair 206. When the aforementioned sides of the switch pair are in the conductive state their respective anodes are at a potential negative with respect to ground. Since the anodes of these sides are connected to the grids of the respective coincidence tubes, these three coincidence tubes 304*a*, 305*b* and 306*a* are cut off.

It will be recalled that the marker pulse must only be generated between successive fields, because if it were to appear during the scanning of a field, the coding sequence would be upset. Now the three coincidence tubes discussed above will all become cut off simultaneously several times during each field as the coding sequence is repeated. To prevent a marker pulse from being generated at these several times, a fourth coincidence tube 306*b* is added. It is normally conducting but must also be cut off simultaneously with the other three, if the marker is to be generated. This fourth tube is so connected that it will be cut off between fields during the marker-blanker pulse beginning at P Fig. 4. The marker-blanker pulse is initiated by the trailing edge of the vertical-drive pulse and lasts for several horizontal periods.

Tube 303 and tube 304 constitute a single-shot cathode-coupled multivibrator which begins operation only with a positive pulse on the grid 331 of tube 303. This condition occurs on receipt of the trailing edge of the vertical-drive pulse, causing tube 303 to become conducting and tube 304 to be cut off. Conduction through the anode load resistor 333 of tube 303 reduces the potential of anode 332 below ground and the direct coupling from this anode to the grid 345*b* of coincidence tube 306*b* cuts off tube 306*b*. Time constants in the multivibrator are such that tube 303 remains conducting for several horizontal periods, sufficient to allow the counter sequence to go through the condition which causes the counter-controlled coincidence tubes also to be cut off, at which time all four coincidence tubes are cut off and a marker pulse is generated across terminals 350 and 351.

Figure 8:
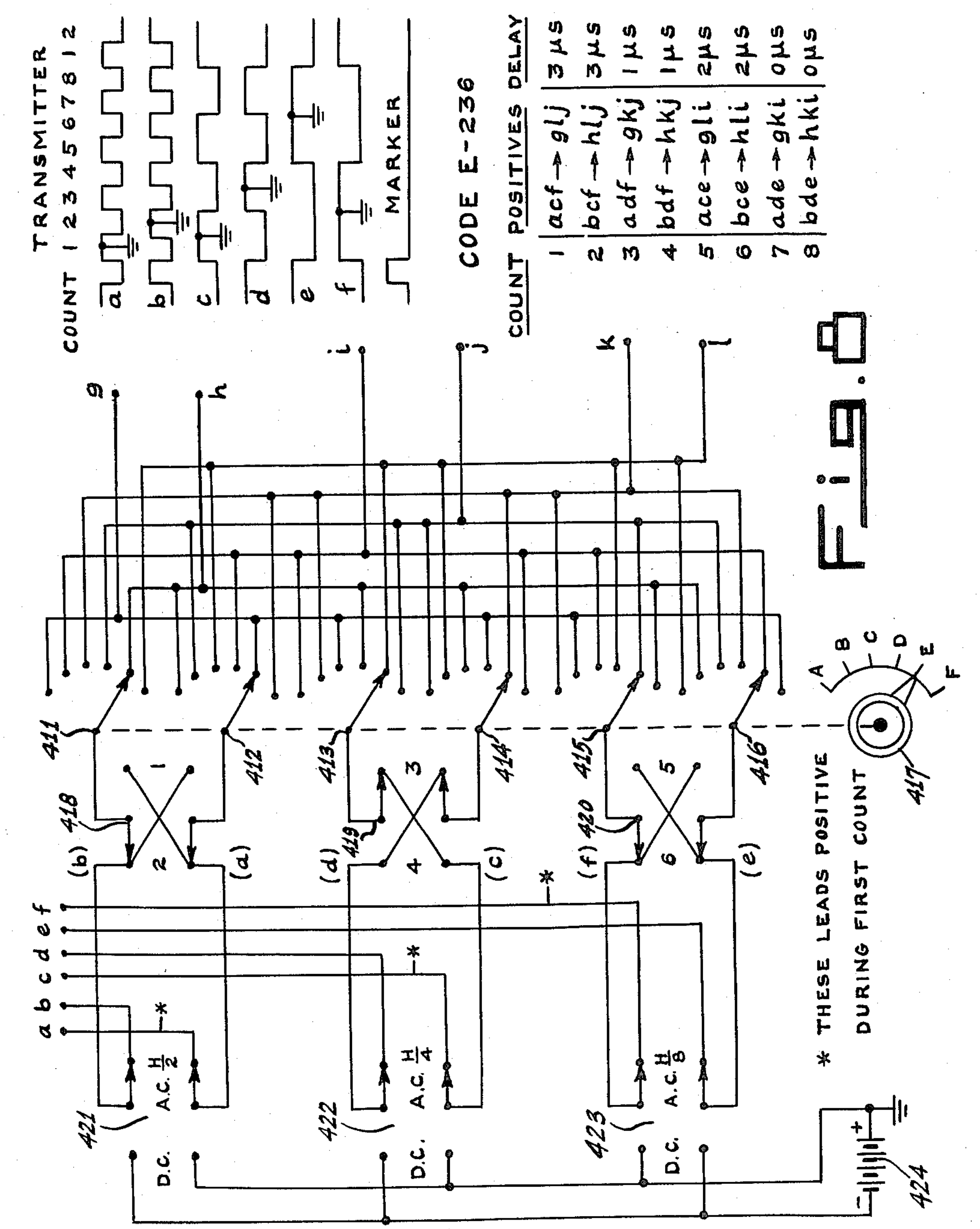
Figure 8 is a diagram of one embodiment of the coding-sequence selector network which connects the switching control tubes to the electronic switches in any one of the several predetermined arrangements.

Figure 8 is a schematic diagram of the coding-sequence switching network 400, shown as a block in Figs. 1 and 1*a*. This unit, or network serves to connect the electronic switches 102 and 103 to the actuating circuits 204, 205 and 206 in any one of a number of predetermined combinations. The reference characters *a* through *f* represent the terminals in the switch-actuating section 200 which are connected to corresponding terminals in the coding-sequence network 400. Likewise, characters *g* through *l* represent terminals in the electronic-switching circuit 100, which are connected to corresponding terminals in the coding-sequence network 400. Manually operable switches 411 through 416 and 418 through 420 serve to connect terminal pairs *ab*, *cd*, and *ef* to terminal pairs *gh*, *ij*, and *kl* in as many combinations as are mathematically possible. Switches 411 through 416 select pair combinations while switches 418 through 420 select the manner by which the individual pair combinations are put together, e.g., *dc* to *ji* or *dc* to *ij*. In other words, they reverse the polarity of connection between terminal pairs. As shown in Fig. 8 the switches are in positions representing the code E–236— the pair-combination switch is in position E of 6 possible positions A through F. The digits 2, 3, 6 show the respective positions of the polarity reversing switches 418, 419 and 420. The table at the lower right in Fig. 8 shows the continuity between various terminals and the delay introduced in the video-signal path with each successive count while code E–236 is set up. For example, terminal *a* connects to terminal *g*, terminal *b* connects to terminal *h*, etc.

This coding system is relatively simple and is used in this case to demonstrate the principle as clearly as possible. It is recognized that a simple code can be "broken" rather easily and it is therefore pointed out that the complexity of the code can be considerably increased by using a larger number of switched delay paths and more counters. Numerous ways of selecting the code to be used can be arranged, such as by a system of punched cards to connect the input to the output terminals of block 400 in Fig. 6.

Double-pole double-throw switches 421, 422 and 423 serve to disconnect the counter signal circuit from the electronic switches and to connect a battery of proper potential to the control electrodes of the electronic switches for testing and adjusting their cut-off operation.

Figure 10:
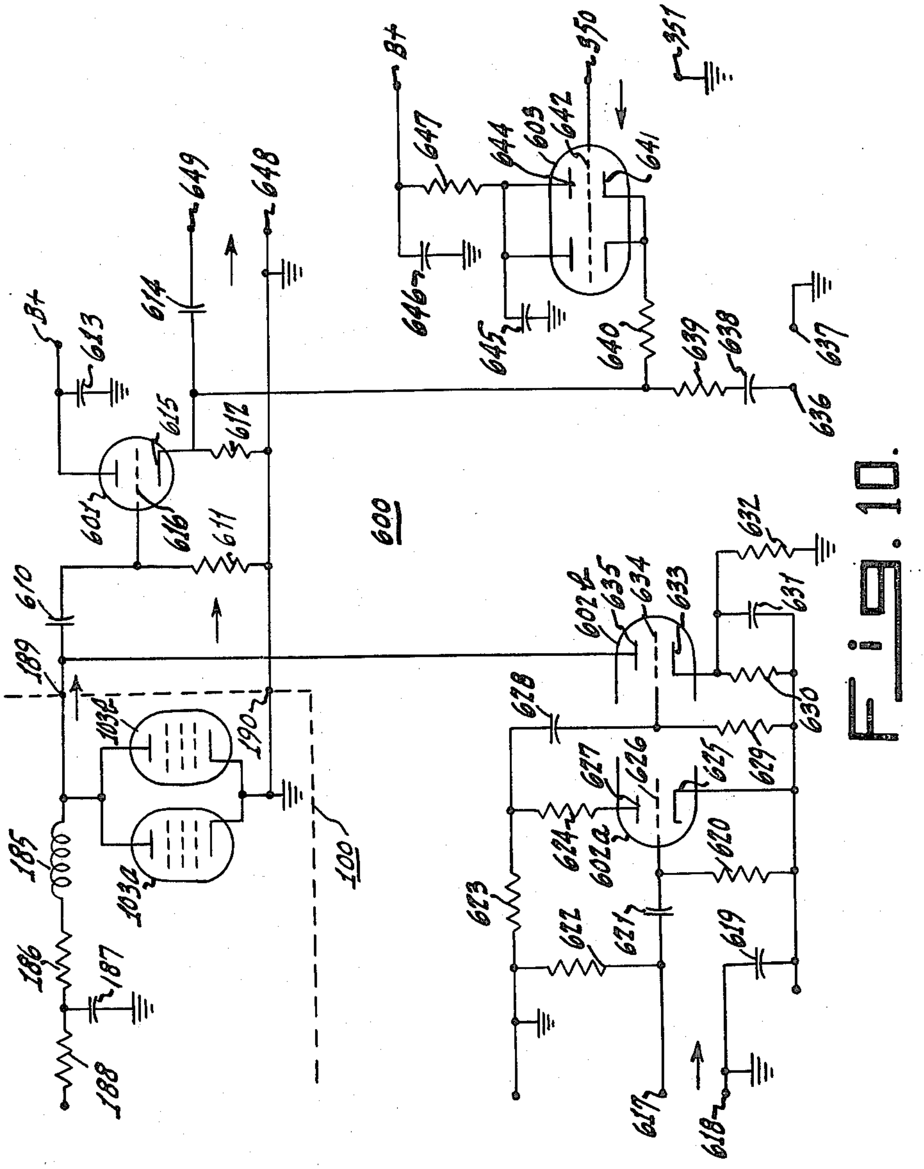
Figure 10 is a schematic diagram of the output combining circuit 600 which unites the various signal components into the composite video signal ready for transmission.

Figure 10 is a detailed schematic diagram showing one way of accomplishing the signal combining operation of block 600 in Fig. 1.

Figure 9:
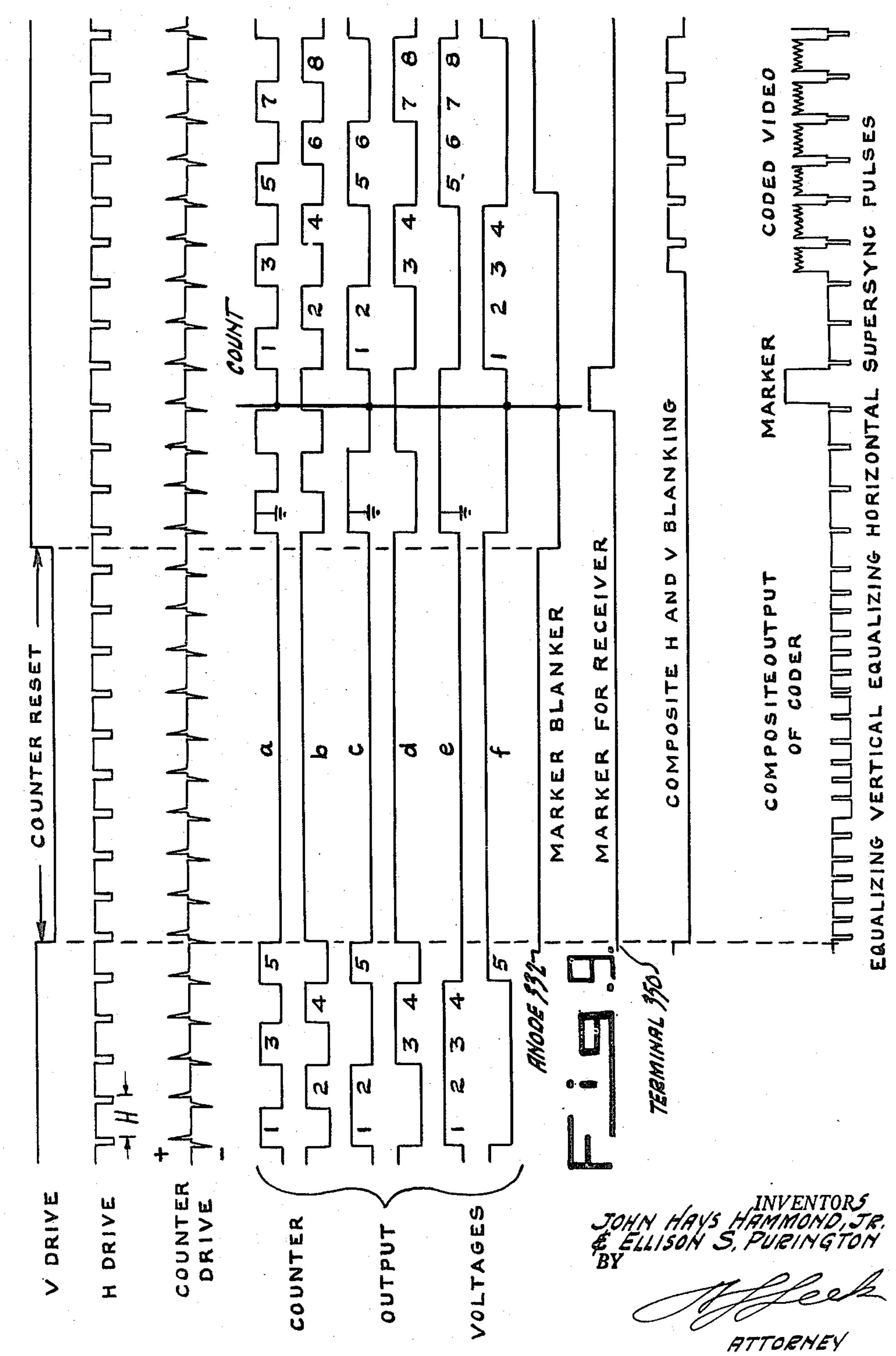
Figure 9 is a chart showing waveforms at various points in circuits 200 and 300 which will aid in the understanding of the production of the counter-actuating pulses and the marker pulse and their relation to the vertical and horizontal drive pulses.

Positive-going scrambled video signals enter on terminals 189 and 190, negative composite H and V blanking pulses, as shown in Fig. 9 enter on terminals 617 and 618, negative supersync pulses enter on terminals 636 and 637 and the positive marker pulses from circuit 300*c* enter on terminals 350 and 351.

The tube 601 is a cathode follower from which the composite output is taken. During the negative excursion of the composite H and V pulses the plate 635 of the tube 602*b* has a lowered potential due to the increased conduction through resistors 187 and 188. This lowered potential is coupled to the grid 616 of tube 601 and is of sufficient negative magnitude to cut off the tube 601 completely for the duration of the blanking pulses. This accomplishes blanking of the video-signal since no video can get to the cathode output while the tube is cut off. Supersync signals, however, can go right through to the composite output terminals 648 and 649.

Marker pulses at terminals 350 and 351 are fed to cathode follower tube 603, the cathode load of which is the combination of resistor 612 and resistor 640. The marker pulse, therefore, appears at the composite output terminals 648 and 649 due to the signal component developed across resistor 612. The signal at terminals 648 and 649 is the complete composite signal ready for modulating the RF carrier.

*Details of receiver circuitry*

Figure 11:
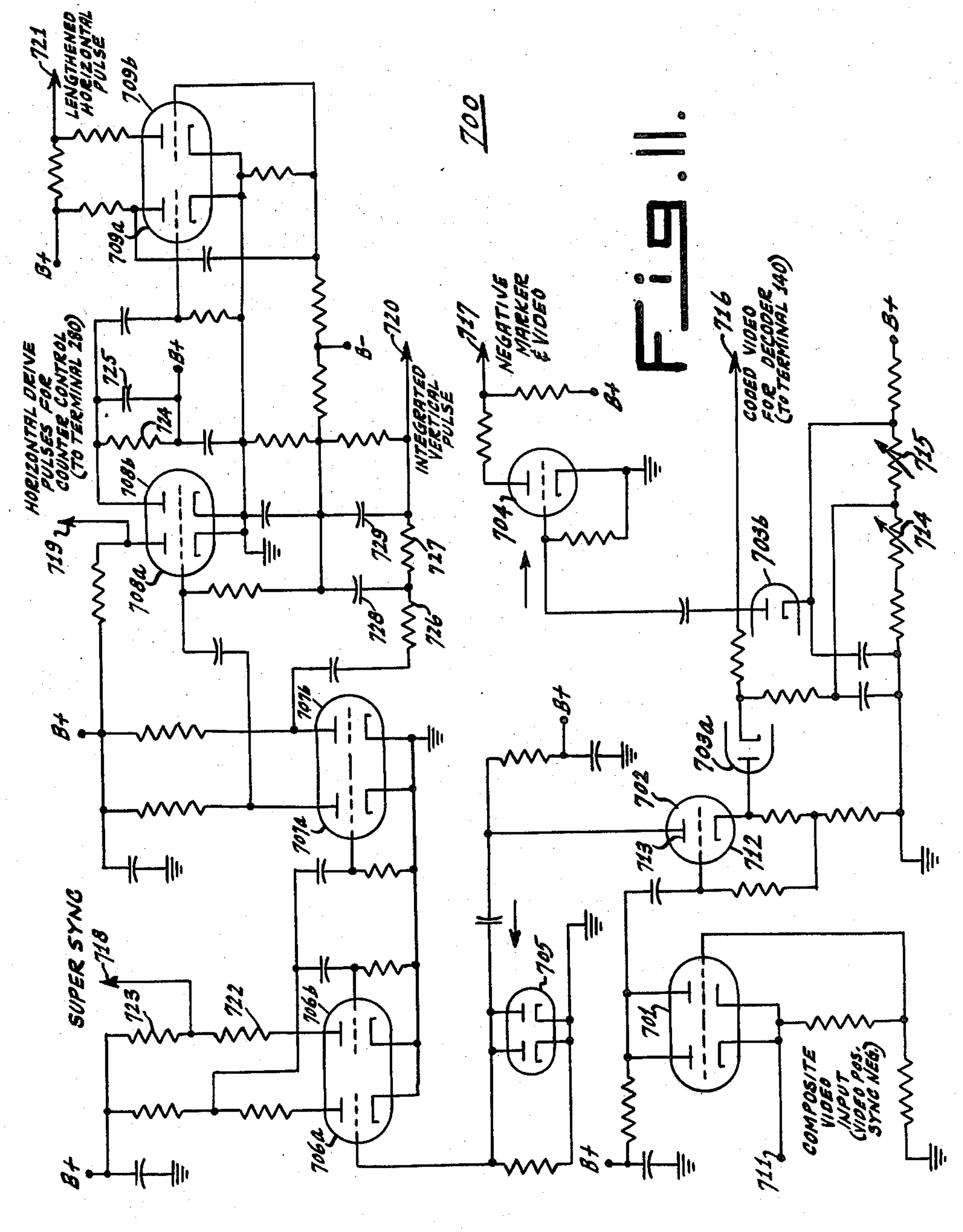
Figure 11 is a schematic diagram of the signal separating circuit 700 which dissects the received composite video signal into its component parts.

As shown in Fig. 11, the composite video signal with negative sync polarity enters on terminal 711 from the video detector and is amplified with no phase reversal by conventional grounded grid amplifier 701. From here it goes to tube 702 from which two outputs are taken; (1) non-phase-inverted signal from the cathode 712, and (2) phase-inverted amplified signal at the plate 713. The plate output will be discussed later. From the cathode output the signal goes through series diode limiter 703*a* and parallel diode limiter 703*b*. By rheostats 714 and 715 the positive cathode potential of diode 703*a* is adjusted to allow only the positive video signal to pass, stripping off the negative sync, and the cathode potential of diode 703*b* is adjusted to limit the video and marker signals to the desired value. At the anode of diode 703*b* we find positive-going video and a positive marker, which, through terminal 716 goes to the input of the video delay amplifier. This same signal is phase inverted by triode 704 to develop a negative-going marker signal to trigger the counter reset circuits, and appears at terminal 717.

We will now discuss the signal appearing at the plate 713 of tube 702. From this output we will derive supersync pulses for deflection control of the display device on terminal 718, negative horizontal drive pulses for the binary counters on terminal 719, an integrated vertical pulse for controlled vertical blanking on terminal 720 and a lengthened horizontal pulse for initiating controlled horizontal blanking on terminal 721.

At the anode of tube 702 we find positive-going sync and negative-going video. By conventional diode clamping the diode 705 clamps the positive peaks of the signal to ground potential. The tube 706*a* then strips off the negative video by cut-off action, passing only phase- inverted sync to tube 706*b* which amplifies and again inverts, producing a positive-going supersync signal at the junction of resistor 722 and resistor 723 for terminal 718.

The negative going sync at the output of the tube 706*a* is also applied to the tubes 707*a* and 707*b*. Positive sync from the output of the tube 707*a* is applied to tubes 708*a* and 708*b*. At the anode of the tube 708*a* we find amplified negative-going horizontal driving pulses for triggering the binary counters. The output of the tube 708*b* is delayed by the RC combination made up of resistor 724 and capacitor 725 and is amplified by the two-stage amplifier consisting of tubes 709*a* and 709*b*, whose output is a lengthened horizontal pulse for driving the controlled horizontal blanking pulse generator.

Returning to the output signal of the tube 707*b*, it is passed through an integrating filter comprising resistors 726 and 727, and capacitors 728 and 729. The output of this filter is an integrated vertical pulse which is used to trigger the controlled vertical blanking generator.

Figure 12:
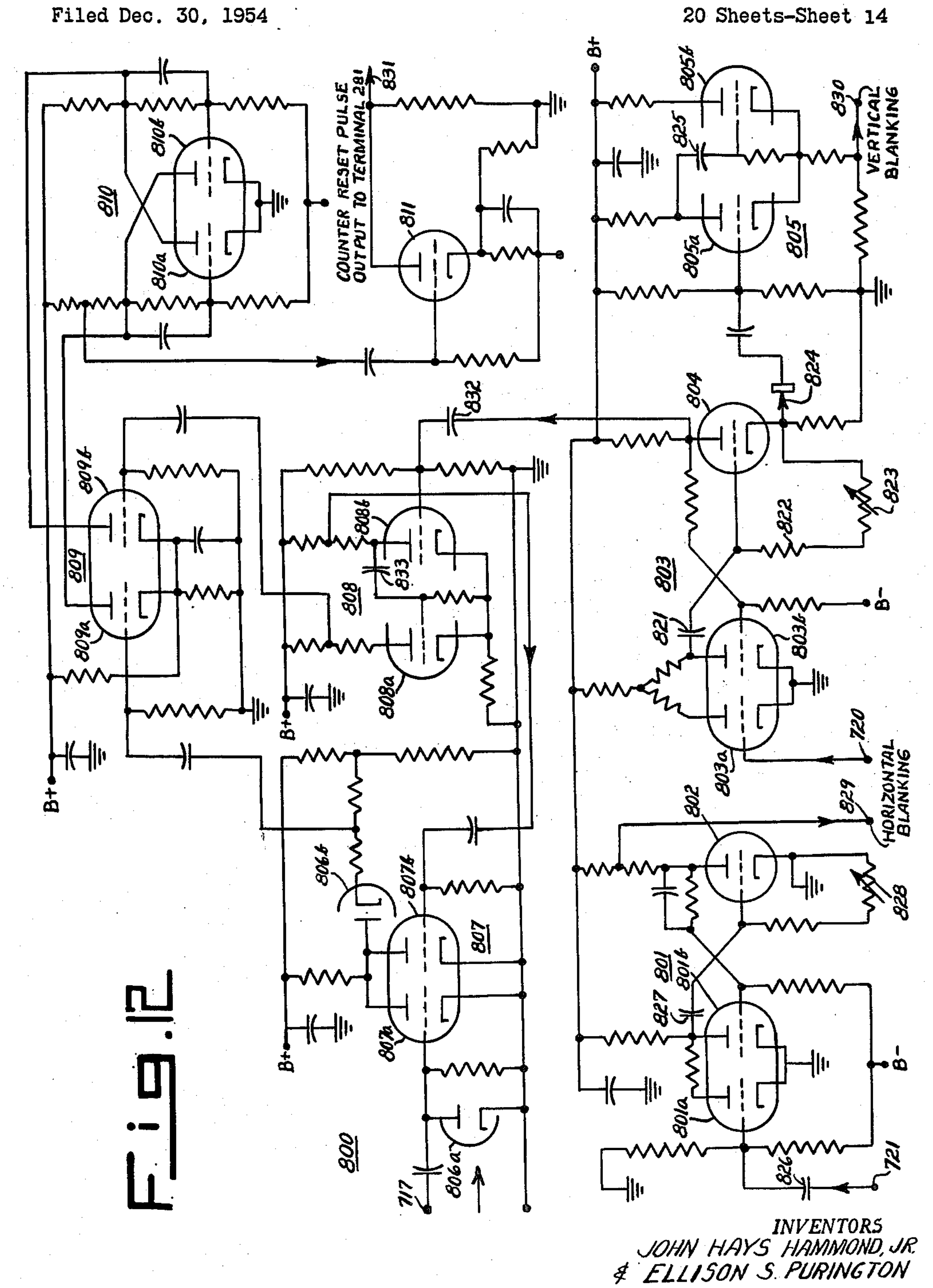
Figure 12 is a schematic diagram of circuit 800 which develops the horizontal and vertical blanking pulses and the counter reset pulse for use in the receiver.

It is desired that the controlled vertical blanking pulse be capable of having a leading edge which starts earlier than the leading edge of the corresponding vertical drive pulse and also capable of having a trailing edge which arrives later than the trailing edge of the same vertical drive pulse. To accomplish this the blanking pulse is actually initiated by the preceding integrated vertical drive pulse, but delayed so as to start slightly before the next integrated vertical pulse arrives. Refer to Figs. 12 and 13 for the following explanation.

This delay is accomplished by the action of two single-shot multivibrators 803 and 804; the first consisting of tubes 803*a*, 803*b* and 804, the second consisting of tubes 805*a* and 805*b*. In the absence of an integrated vertical pulse tubes 803*a* and 803*b* are cut off while tube 804 is conducting. The arrival of the integrated pulse from terminal 720 causes the tube 803*a* to become conductive, lowering the grid potential of the tube 804 and cutting it off. This applies a positive potential to the grid of tube 803*b* causing a further negative drop of the grid of tube 804. Tube 804 remains cut off until the capacitor 821 discharges through resistors 822 and 823. The instant when tube 804 again begins conducting, a positive going pulse is passed from the cathode of tube 804 to the second multivibrator through a rectifier 824.

This initiates the leading edge of the vertical blanking pulse. The delay time extends from the time the integrated pulse caused tube 803*a* to become conducting until capacitor 821 discharges sufficiently to allow tube 804 to conduct again. This time is controlled by varying the discharge time of capacitor 821 by adjusting resistor 823.

In the second single-shot multivibrator 805 tube 805*a* is normally non-conductive and tube 805*b* is normally conducting. The positive pulse from the rectifier 824 arriving on the grid of the tube 805*a* causes that tube to start conducting, thus cutting off tube 805*b*. Tube 805*b* then remains cut off for the duration of the positive pulse on the grid of tube 805*a* plus the discharge time of capacitor 825. The circuit constants are adjusted so that less current flows through the tube 805*a* while it is conducting than through tube 805*b* while it is conducting, with the result that negative blanking pulses appear at the cathodes of tubes 805*a* and 805*b* as shown in the last trace in Fig. 13 and go to the end circuit 900 through terminal 830.

Thus the vertical blanking pulse has a leading edge starting at the end of the first delay, and a trailing edge starting at the end of the second delay.

The horizontal blanking pulse is generated in a manner similar to the generation of the vertical blanking pulse, but by the single-shot multivibrator 801 comprising tubes 801*a*, 801*b* and 802. The lengthened horizontal pulse at terminal 721 is differentiated by capacitor 826 so that the positive-going trailing edge yields a sharp positive pulse at the grid of the normally cut off tube 801*a*. This triggers tube 801*a* into conduction, sending a negative pulse to the normally conducting tube 802, cutting it off and causing the tube 801*b* to conduct heavily. This condition remains for approximately one line length, but is precisely determined by the discharge time of capacitor 827 which is controlled by varying resistor 828. When 802 again conducts a potential drop appears at terminal 829 forming the leading edge of the negative-going horizontal blanking pulse. The trailing edge is formed when the next differentiated pulse arrives at the grid of tube 801*a* which again cuts off tube 802. Thus we have a horizontal blanking pulse whose leading edge time is controllable by resistor 828 and can occur earlier than the corresponding horizontal driving pulse, and whose trailing edge occurs after the end of the horizontal driving pulse by the amount of lengthening produced by RC combination comprising resistor 724 and capacitor 725.

Figure 14:
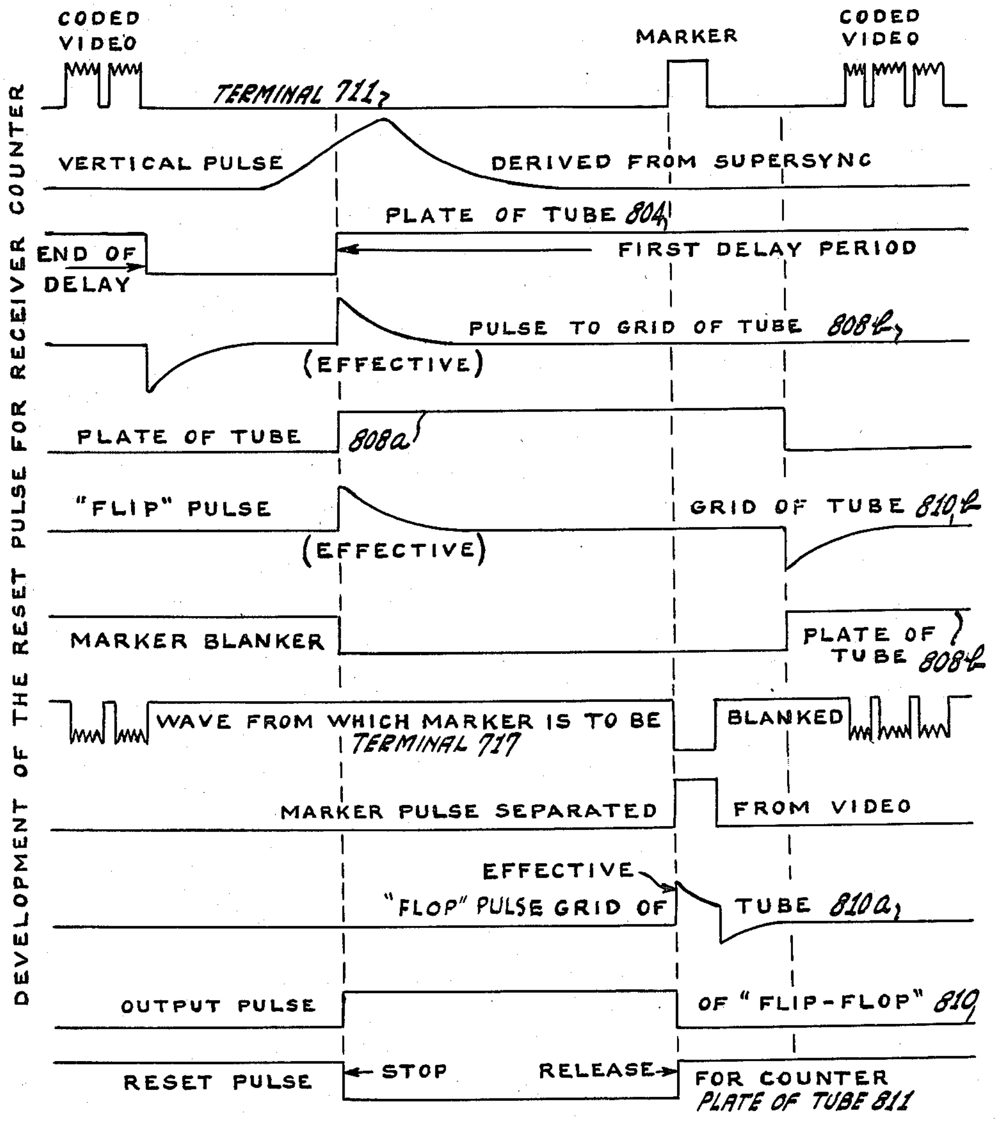
Figure 14 is a graph of waveforms appearing in circuit 800 which will aid in the understanding of the production of the counter-reset pulse.

The counter reset pulse output is found at terminal 831 and is generated by cooperation of the negative marker pulse at terminal 717 and the integrated vertical pulse produced by circuitry in Fig. 11. Waveforms which will help in the understanding of the reset-pulse generation are shown in Fig. 14.

The reset pulse disables the binary counters on its negative-going leading edge and holds them inoperative until its positive-going trailing edge releases them. The leading edge occurs when the integrated vertical pulse triggers the first-delay multivibrator; the trailing edge occurs at the beginning of the marker pulse.

We will first discuss the formation of the leading edge. When the integrated vertical pulse arrives at the grid of tube 803*a*, tube 804 is caused to be cut off, delivering a positive pulse through differentiating capacitor 832 and thus applying a sharp positive pulse to the grid of the tube 808*b*, which is the normally non-conducting tube of the single-shot multivibrator 808. This positive pulse triggers tube 808*a* into conduction and extinguishes tube 808*b*, sending a positive pulse to a driver flip-flop 809 comprising tube 809*a* and tube 809*b*. The driver flip-flop in turn actuates a second flip-flop 810 comprising tube 810*a* and tube 810*b*. The positive pulse supplied by the anode of tube 808*a* changes the conduction state of flip-flop 809 and then flip-flop 810 such that the output pulse of phase inverter tube 811 will be negative going.

As was mentioned earlier, the leading edge of the negative marker pulse initiates the trailing edge of the reset pulse to release the binary counters. As the marker signal appears at terminal 717 extraneous video signal is also present, and it is desirable to remove the video prior to applying the marker pulse to the flip-flop 809 to prevent false firing of the flip-flop. This is done by coincidence circuit 807 comprising tubes 807*a* and 807*b*. The grids of both of these tubes must be negative simultaneously for the potential on their paralleled anodes to rise positively and thus deliver a positive pulse to the grid of tube 809*a* which will reverse the flip-flop 809 and make the trailing edge of the reset pulse.

The positive portion of negative marker pulse is clamped to ground by diode 806*a* making the grid of the tube 807*a* negative during the marker pulse. The grid of tube 807*b* is also made negative during the discharge period of capacitor 833. This period extends beyond the duration of the marker pulse but ends prior to the vertical blanking pulse. The series diode 806*b* couples the positive-going pulse from the coincidence circuit to the grid of tube 809*a*, but does not allow the negative signal to pass when the coincidence tube 807 begins to conduct. This prevents a false triggering of the flip-flop 809.

We thus have generated a complete reset pulse by triggering the flip-flop 810 into one state by the integrated vertical pulse and reversing it by the leading edge of the marker pulse. The action of resetting the counters is identical to that in the transmitter and was described in detail earlier.

Figure 15:
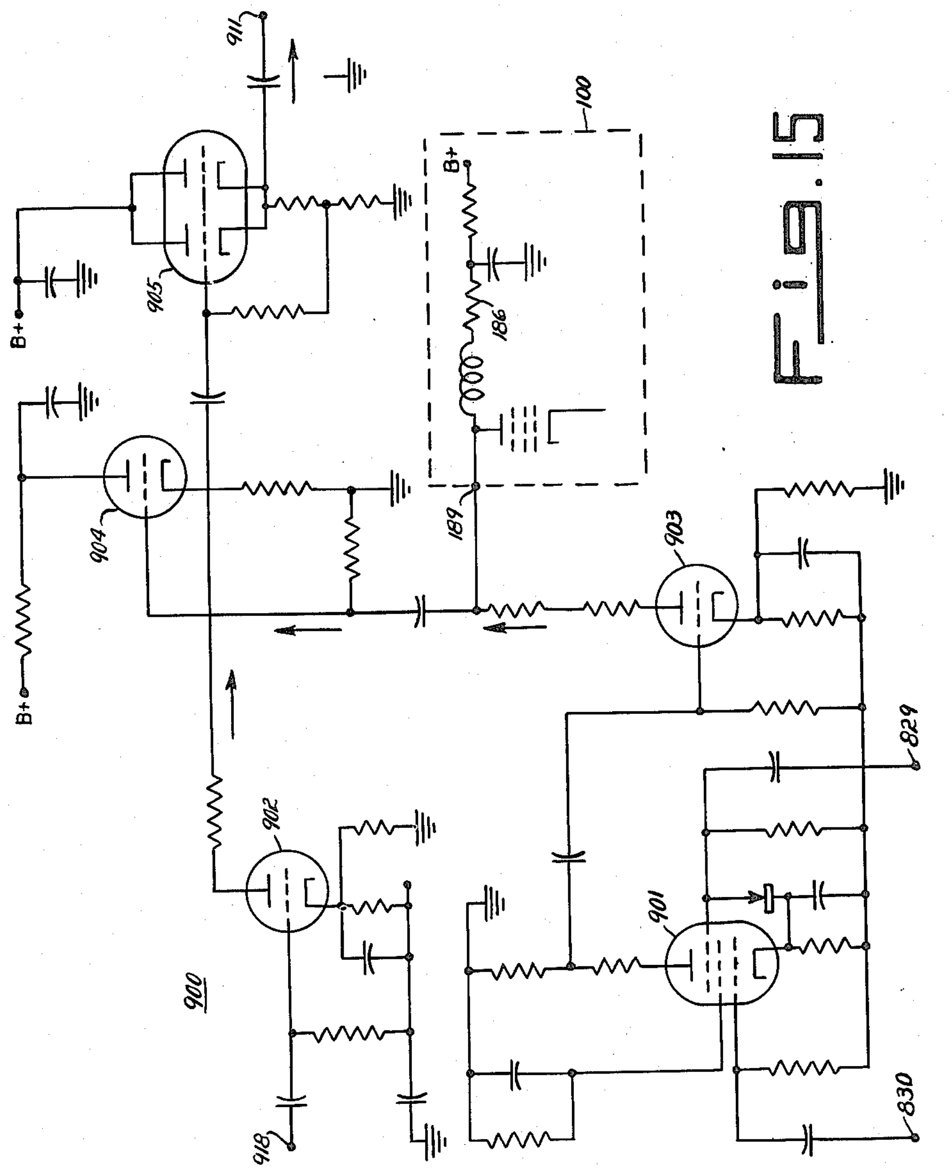
Figure 15 is a schematic diagram of the output combining circuit 900, which recombines the various signals after video unscrambling for use at the display device, such as a kinescope.
Figure 17:
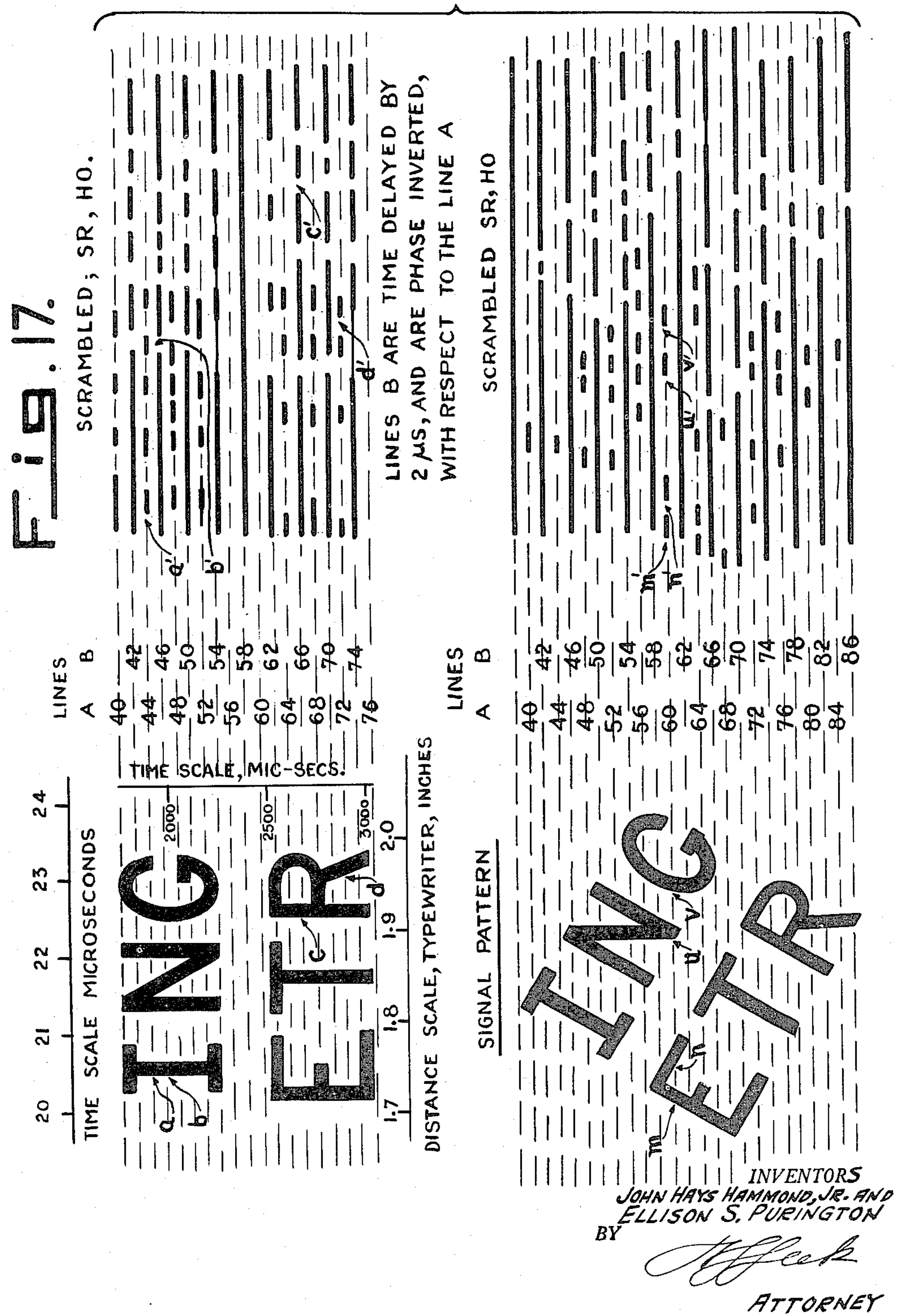

The combining circuit 900 shown in Fig. 15 combines the supersync, vertical blanking, horizontal blanking and decoded video and produces at terminal 911 a composite signal for driving a kinescope or other type of display tube.

Decoded video from the electronic switch 100 is fed to cathode follower 904, which drives power-output cathode follower 905. The vertical and horizontal blanking signals, respectively, are fed to separate grids of pentode 901, the positive-going output of which is coupled to blanking tube 903. The tube 903 is biased to conduct only when receiving positive signal and blanking results due to the increased voltage drop across the video load resistor 186 when tube 903 is conducting. Positive supersync from terminal 718 is phase inverted in tube 902 and coupled to the output circuit at the cathode of tube 904. Thus the composite signal is complete at terminal 911.

Figure 17:
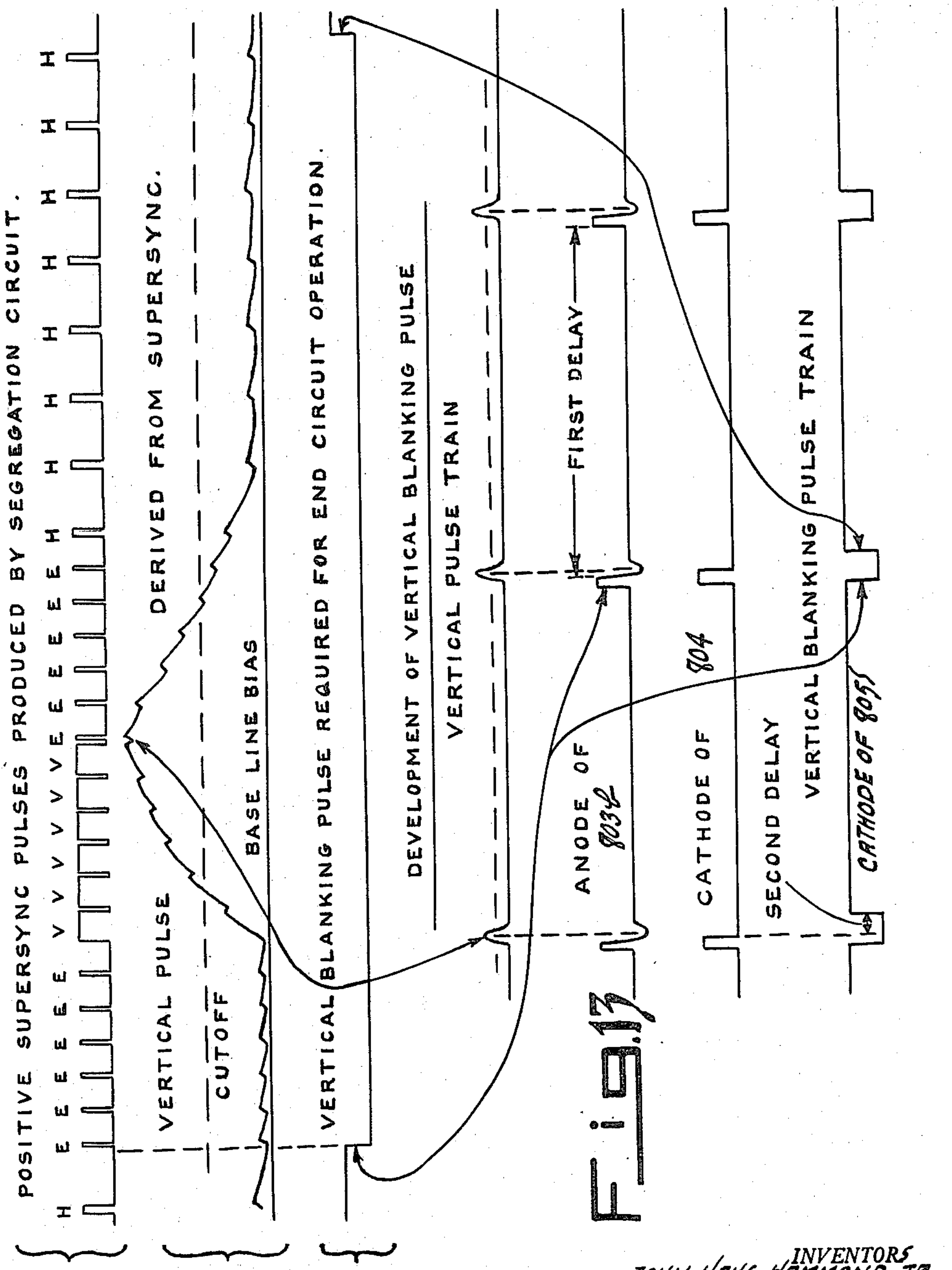
Figures 17 and 18 are charts showing how the scrambled picture would appear on a viewing screen, without an unscrambler, using the various types of combination scrambling.
Figure 18:
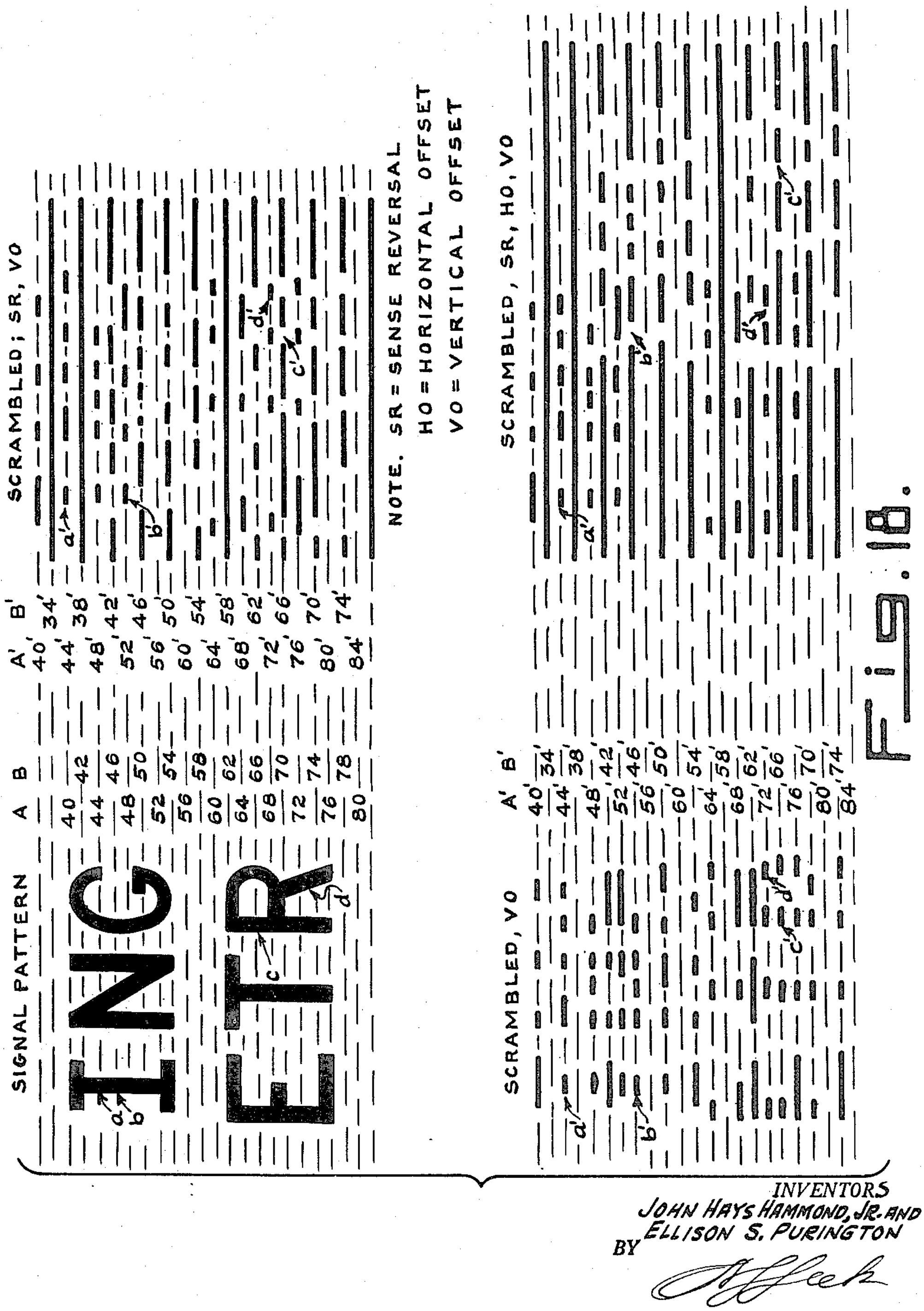

One embodiment of this invention has been described in great detail, namely, the horizontal offset (HO) method of scrambling. But it has been mentioned earlier that other methods of scrambling the video signal are possible, such as sense reversal (SR) and vertical offset (VO). The degree of secrecy will be enhanced greatly if combinations of the different methods are used, as for example the combinations displayed in Figures 17 and 18.

Figure 16 shows a circuit 500 which is a two stage scrambler for producing a combination scrambling of horizontal offset and sense reversal. Tube 501 is a phase splitter which feeds video signal of opposite phase to the two tubes of an electronic switch comprising tube 502 and tube 503. The phase or sense of the output of this electronic switch will be determined by which tube is conducting, the conduction being controlled by the earlier described binary counter 200. This output is again phase split by tube 504 and the action of tubes 505 and 506 repeats that of tubes 502 and 503, except that a 2 microsecond delay line which couples the signal to tube 506 causes a line delay while tube 506 is conducting and polarity reversal with no delay while tube 505 is conducting. That the complexity of scrambling is increased by this method is obvious in view of the detailed explanation of the HO and SR methods presented earlier.

Having thus described our invention, what we claim as new and desire to secure by Letters Patent is:

1. A secrecy television system comprising a transmitter and a receiver; the transmitter comprising means to form successive lines of electronic signals in frames representative of the image to be conveyed, a horizontal synchronization pulse generator, a vertical synchronization pulse generator, a differentiator for the horizontal synchronization pulses, a tandem series of counters fed by said differentiator, a coding sequence switching network, a set of electronic switches, buffer amplifiers coupling said counters to said switches through said coding sequence switching network, a video amplifier for said picture signals, a series of signal-modifying means fed by said video amplifier in different paths which provide different signal modifications, the selection of path for any line of video signals being determined by said electronic switches, said switches being controlled by the counters and the coding sequence switching network in a cyclically repetitive pattern, a generator of marker pulses for enabling the receiver to start its de-coding sequence in proper code pattern phase, a counter reset circuit for returning said counters to their starting condition at the end of each field, a coincidence circuit associated with said counter reset and said marker pulse generator to effect the generation of a marker pulse, said coincidence circuit having a finite rise time and a decay time duration of less than one code-sequence cycle, whereby the marker pulse generation is effected only at the end of the first counter code-sequence signal immediately following each vertical synchronization pulse, combining circuit for producing a composite signal made up of a modified video signal, the vertical and horizontal synchronizing pulses and the marker pulses, said composite signal serving to modulate the radio frequency carrier put out by the transmitter; said receiver having corresponding counters, electronic switches, and signal-modifying means, and having a decoding sequence switching network capable of being manually set to a sequence complementary to that of the transmitter's coding sequence switching network, signal separating circuit for deriving from the transmitted composite signal modified video signal, line and field synchronizing pulses, counter driving pulses, and both horizontal and vertical blanking pulses, said blanking pulses having controlled duration for blanking the display device for periods longer than the duration of the transmitted blanking pulses.

2. The system of claim 1 in which the signal-modifying means comprises a plurality of time delay circuits.

3. The system of claim 1 in which the signal-modifying means comprises a signal polarity reversal means.

4. The system of claim 1 in which the signal-modifying means comprises line storage and retrieval means for rearranging the order of occurrence of the lines.

References Cited in the file of this patent

UNITED STATES PATENTS

| | | |
|---|---|---|
| 2,406,350 | Harrison | Aug. 27, 1946 |
| 2,472,774 | Mayle | June 7, 1949 |
| 2,510,046 | Ellett et al. | May 30, 1950 |
| 2,547,598 | Roschke | Apr. 3, 1951 |
| 2,656,407 | Herrick et al. | Oct. 20, 1953 |
| 2,697,741 | Roschke | Dec. 21, 1954 |
| 2,757,226 | Zworykin | July 31, 1956 |
| 2,823,252 | Bridges | Feb. 11, 1958 |

FOREIGN PATENTS

| | | |
|---|---|---|
| 15,789/34 | Australia | Jan. 19, 1934 |
| 1,034,776 | France | Apr. 15, 1953 |